(12) United States Patent
Lieberman et al.

(10) Patent No.: US 7,417,681 B2
(45) Date of Patent: Aug. 26, 2008

(54) MULTIFUNCTIONAL INTEGRATED IMAGE SENSOR AND APPLICATION TO VIRTUAL INTERFACE TECHNOLOGY

(75) Inventors: Klony Lieberman, Jerusalem (IL); Yuval Sharon, Kohav Hashahar (IL); Yaniv Maor, Jerusalem (IL)

(73) Assignee: VKB Inc., Wilmington, DE (US)

( * ) Notice: Subject to any disclaimer, the term of this patent is extended or adjusted under 35 U.S.C. 154(b) by 764 days.

(21) Appl. No.: 10/823,337

(22) Filed: Apr. 13, 2004

(65) Prior Publication Data

US 2004/0207732 A1 Oct. 21, 2004

Related U.S. Application Data

(62) Division of application No. 10/481,932, filed as application No. PCT/IL03/00538 on Jun. 26, 2003, now Pat. No. 7,307,661.

(60) Provisional application No. 60/438,327, filed on Jan. 7, 2003, provisional application No. 60/392,376, filed on Jun. 26, 2002.

(51) Int. Cl.
*H04N 7/18* (2006.01)
*H04N 5/222* (2006.01)
*G03B 17/00* (2006.01)
*G06F 3/02* (2006.01)
*G09G 5/00* (2006.01)
*A63F 9/24* (2006.01)

(52) U.S. Cl. .................. 348/333.1; 348/156; 396/300; 345/170; 345/175; 345/168; 463/14

(58) Field of Classification Search ................. 348/148, 348/156, 333.1, 373, 375; 463/14; 396/300; 345/168, 170, 175
See application file for complete search history.

(56) References Cited

U.S. PATENT DOCUMENTS

| | | | |
|---|---|---|---|
| 4,561,017 | A | 12/1985 | Greene |
| 4,843,568 | A | 6/1989 | Krueger et al. |
| 5,181,108 | A | 1/1993 | Greene |
| 5,181,181 | A | 1/1993 | Glynn |
| 5,182,659 | A | 1/1993 | Clay et al. |

(Continued)

FOREIGN PATENT DOCUMENTS

DE 29802435 6/1998

(Continued)

OTHER PUBLICATIONS

Leibe, et al., "Toward spontaneous interaction with the perceptive workbench", IEEE computer graphics and applications, IEEE service center, New York, NY vol. 20, No. 6, Nov. 2000, pp. 54-64.

(Continued)

*Primary Examiner*—John M Villecco
(74) *Attorney, Agent, or Firm*—Ladas & Parry LLP

(57) ABSTRACT

An electronic camera including an electronic imaging sensor providing an output representing an imaged field, a first imaging functionality employing the electronic imaging sensor for taking a picture of a scene in the imaged field, a second imaging functionality employing the electronic imaging sensor for data entry responsive to user hand activity and a user-operated imaging functionality selection switch operative to enable a user to select operation in one of the first and second imaging functionalities.

23 Claims, 23 Drawing Sheets

U.S. PATENT DOCUMENTS

| | | |
|---|---|---|
| 5,457,550 A | 10/1995 | Baba et al. |
| 5,680,205 A | 10/1997 | Borza |
| 5,767,842 A | 6/1998 | Korth |
| 5,781,252 A | 7/1998 | Gale |
| 5,952,731 A * | 9/1999 | McPherson et al. ........ 307/10.2 |
| 6,043,839 A | 3/2000 | Adair et al. |
| 6,218,967 B1 * | 4/2001 | Maula ......................... 341/31 |
| 6,281,238 B1 | 8/2001 | Wrobel et al. |
| 6,281,878 B1 * | 8/2001 | Montellese ................. 345/156 |
| 6,297,894 B1 | 10/2001 | Miller et al. |
| 6,377,238 B1 | 4/2002 | McPheters |
| 6,424,338 B1 | 7/2002 | Anderson |
| 6,607,277 B2 | 8/2003 | Yokoyama et al. |
| 6,611,252 B1 | 8/2003 | DuFaux |
| 6,614,422 B1 * | 9/2003 | Rafii et al. .................. 345/168 |
| 6,650,318 B1 | 11/2003 | Arnon |
| 6,690,354 B2 * | 2/2004 | Sze ............................ 345/156 |
| 6,690,357 B1 * | 2/2004 | Dunton et al. ............. 345/158 |
| 6,710,770 B2 | 3/2004 | Tomasi et al. |
| 6,750,849 B2 | 6/2004 | Potkonen |
| 6,798,401 B2 | 9/2004 | Dufaux |
| 6,854,870 B2 * | 2/2005 | Huizenga .................... 362/501 |
| 6,911,972 B2 | 6/2005 | Brinjes |
| 7,151,530 B2 * | 12/2006 | Roeber et al. ............... 345/168 |
| 7,215,327 B2 * | 5/2007 | Liu et al. .................... 345/168 |
| 7,230,611 B2 * | 6/2007 | Bischoff ..................... 345/175 |
| 7,242,388 B2 * | 7/2007 | Lieberman et al. .......... 345/158 |
| 7,248,151 B2 * | 7/2007 | Mc Call ................. 340/426.35 |
| 7,307,661 B2 * | 12/2007 | Lieberman et al. ....... 348/333.1 |
| 2002/0021287 A1 | 2/2002 | Tomasi et al. |
| 2003/0132921 A1 * | 7/2003 | Torunoglu et al. .......... 345/173 |
| 2004/0046744 A1 * | 3/2004 | Rafii et al. .................. 345/168 |
| 2005/0169527 A1 | 8/2005 | Longe et al. |
| 2006/0101349 A1 * | 5/2006 | Lieberman et al. .......... 715/773 |
| 2006/0190836 A1 * | 8/2006 | Ling Su et al. .............. 715/773 |
| 2007/0222760 A1 * | 9/2007 | Lieberman et al. .......... 345/168 |
| 2008/0074386 A1 * | 3/2008 | Lee et al. .................... 345/168 |

FOREIGN PATENT DOCUMENTS

| | | |
|---|---|---|
| EP | 0982676 | 3/2000 |
| EP | 1 039 365 | 9/2000 |
| FR | 2 756 077 | 5/1998 |
| WO | WO 00/21024 | 4/2000 |
| WO | WO 01/59975 | 8/2001 |
| WO | WO 01/93182 | 12/2001 |
| WO | WO 02/054169 | 7/2002 |

OTHER PUBLICATIONS

Supplementary European Search Report dated Aug. 14, 2007 for European Application No. EP 01 27 2779.

* cited by examiner

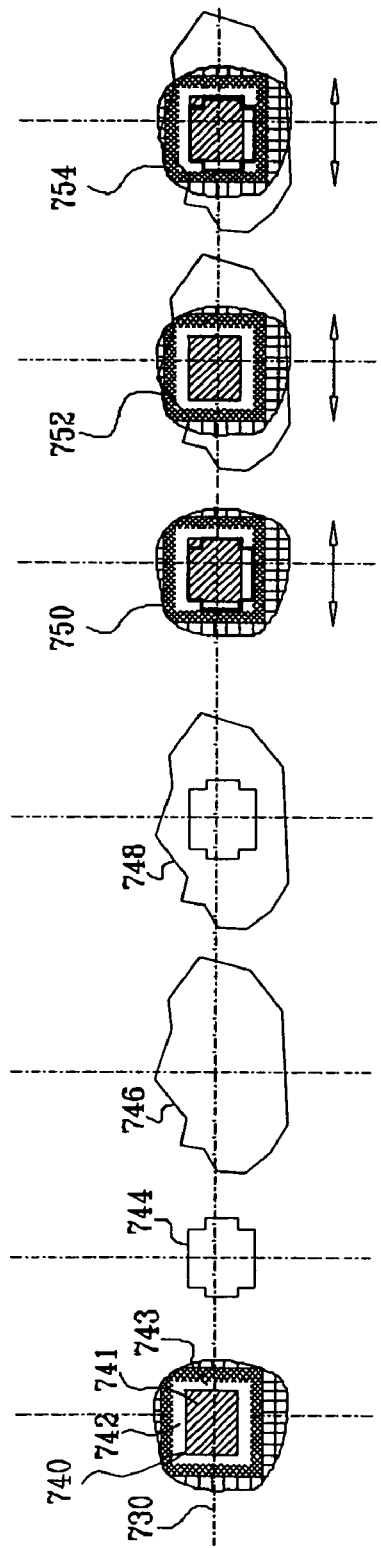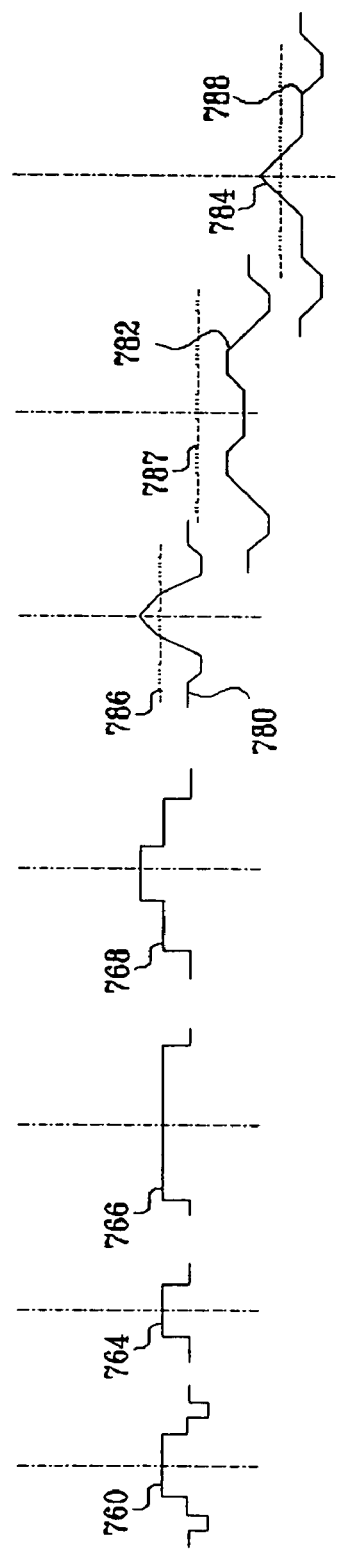

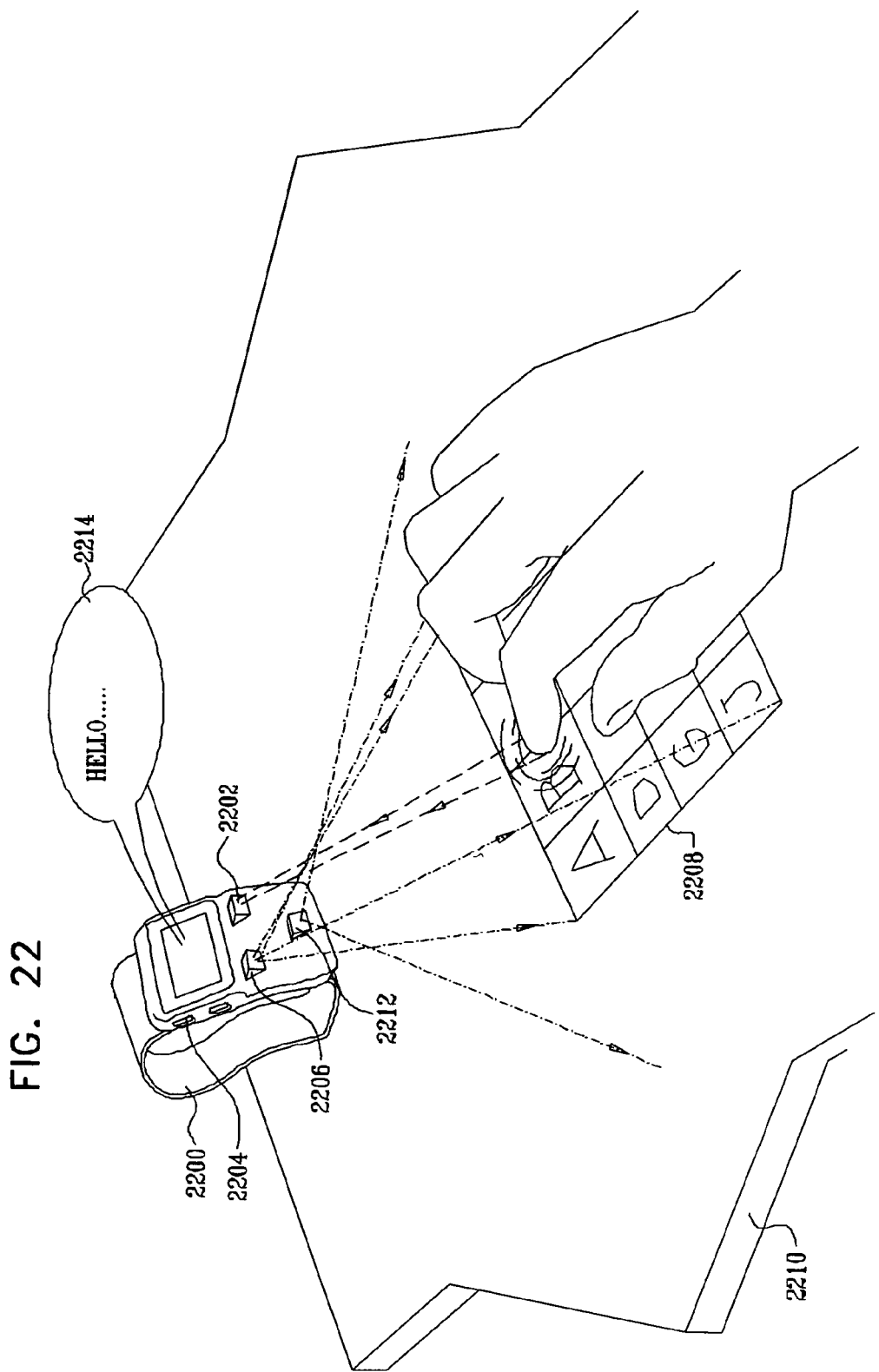

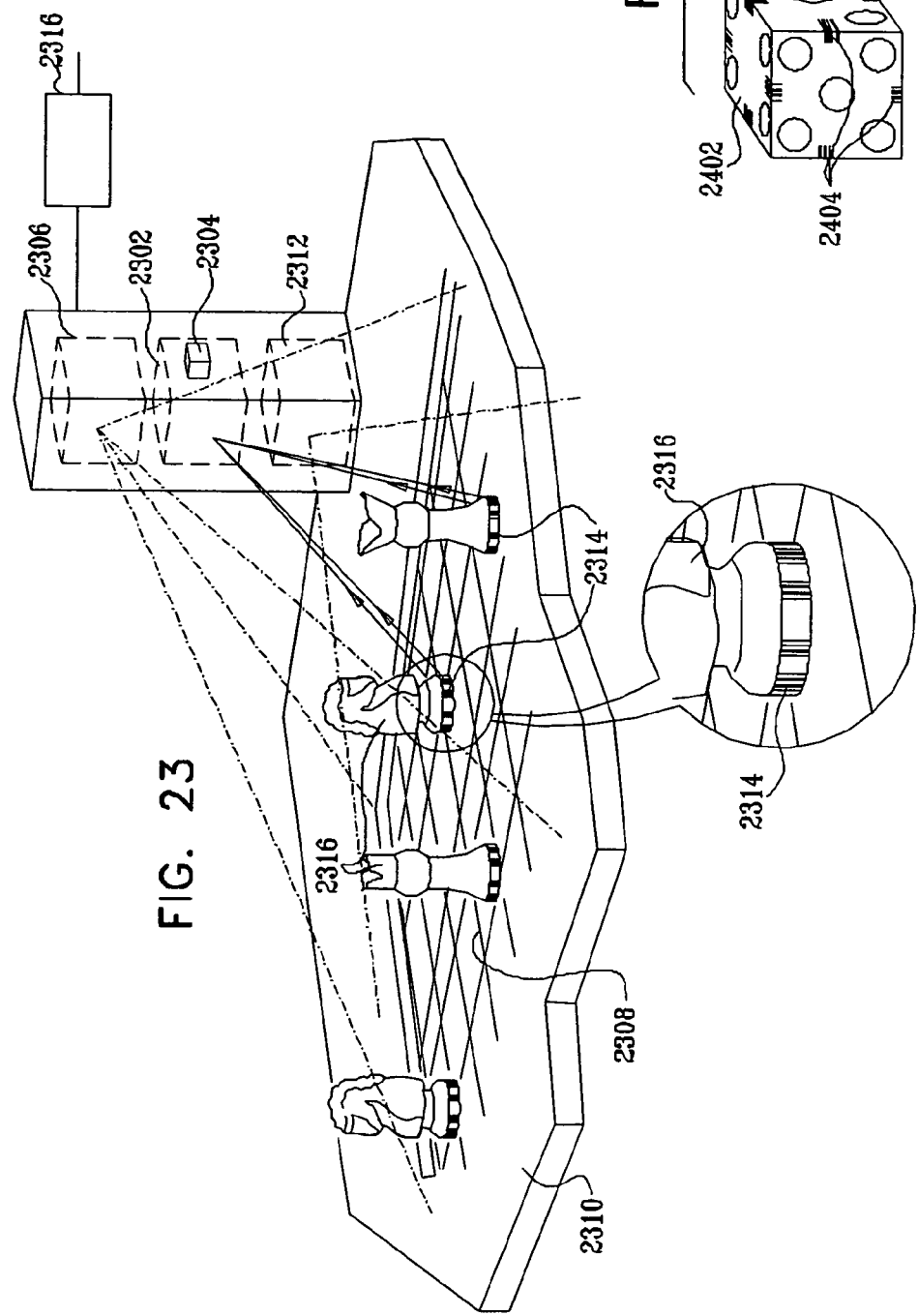

US 7,417,681 B2

MULTIFUNCTIONAL INTEGRATED IMAGE SENSOR AND APPLICATION TO VIRTUAL INTERFACE TECHNOLOGY

REFERENCE TO CO-PENDING APPLICATIONS

This application is a divisional of application Ser. No. 10/481,932 filed on Jun. 15, 2005 now U.S. Pat. No. 7,037,661 which is International Application PCT/IL03/00538 filed on Jun. 26, 2003, which designated the U.S., claims the benefit thereof and incorporates the same by reference. The nonprovisional application designated above, namely application 10/481.932, filed Dec. 23, 2003, claims the benefit of U.S. Provisional application Ser. No. 60/392,376, entitled "Virtual Interface Implementation and Application", filed Jun. 26, 2002 and U.S. Provisional application Ser. No. 60/438,327, entitled "Multifunctional Integrated Image Sensor and Application to Virtual Interface Technology", filed Jan. 7, 2003.

BACKGROUND OF THE INVENTION

The following patents and publications are believed to represent the current state of the art:

U.S. Pat. Nos. 6,377,238; 6,281,238; 5,767,842; 5,457,550; 5,181,181 and 4,843,568.

Foreign Patent Documents: WO 00/21024; EP 0982 676 A1; DE 298 02 435 U1; WO 01/93182 and WO 02/054169.

SUMMARY OF THE INVENTION

The present invention relates to data input methods and apparatus generally.

There is thus provided in accordance with a preferred embodiment of the present invention an electronic camera including an electronic imaging sensor providing an output representing an imaged field, a first imaging functionality employing the electronic imaging sensor for taking a picture of a scene in the imaged field, a second imaging functionality employing the electronic imaging sensor for data entry responsive to user hand activity and a user-operated imaging functionality selection switch operative to enable a user to select operation in one of the first and second imaging functionalities.

There is also provided in accordance with another preferred embodiment of the present invention a portable telephone including telephone functionality, an electronic imaging sensor providing an output representing an imaged field, a first imaging functionality employing the electronic imaging sensor for taking a picture of a scene in the imaged field, a second imaging functionality employing the electronic imaging sensor for data entry responsive to user hand activity and a user-operated imaging functionality selection switch operative to enable a user to select operation in one of the first and second imaging functionalities.

There is further provided in accordance with yet another preferred embodiment of the present invention a digital personal assistant including at least one personal digital assistant functionality, an electronic imaging sensor providing an output representing an imaged field, a first imaging functionality employing the electronic imaging sensor for taking a picture of a scene in the imaged field, a second imaging functionality employing the electronic imaging sensor for data entry responsive to user hand activity and a user-operated imaging functionality selection switch operative to enable a user to select operation in one of the first and second imaging functionalities.

In accordance with another preferred embodiment of the present invention the electronic imaging sensor includes a CMOS sensor.

Preferably, the first imaging functionality incorporates a first lens arrangement upstream of the electronic imaging sensor. Additionally, the second imaging functionality incorporates a second lens arrangement upstream of the electronic imaging sensor.

In accordance with yet another preferred embodiment of the present invention the second imaging functionality incorporates an infrared light generator for defining a light beam, impingement of which resulting from the user hand activity produces a light pattern representative of the data. Additionally, the second imaging functionality also incorporates at least one infrared passing light filter associated with the electronic imaging sensor.

In accordance with still another preferred embodiment of the present invention the second imaging functionality incorporates a processor receiving an output from the electronic imaging sensor for providing a data entry output. Additionally, the processor is incorporated together with the electronic imaging sensor on a single chip.

In accordance with another preferred embodiment of the present invention the first functionality is a color photography functionality. Additionally or alternatively, the second functionality is an infrared beam impingement sensing data entry functionality.

In accordance with yet another preferred embodiment of the present the user-operated imaging functionality selection switch is a mechanically responsive switch which selectably mechanically associates the first and second lens arrangements upstream of the electronic imaging sensor. Alternatively or additionally, the user-operated imaging functionality selection switch is a mechanically responsive switch which selectably mechanically associates selected filters with the electronic imaging sensor.

In accordance with still another preferred embodiment of the present invention the user-operated imaging functionality selection switch is an electronically responsive switch which selectably electronically determines responsiveness to selected outputs from predetermined portions of the electronic imaging sensor.

In accordance with another preferred embodiment of the present invention the electronic camera also includes an array of red, green, blue and infrared passing pixelwise elements arranged over the electronic imaging sensor. Additionally or alternatively, the electronic camera also includes a data entry template projector employed by the second imaging functionality. Preferably, the electronic camera also includes an illuminator employed by the second imaging functionality. Additionally or alternatively, the electronic camera also includes a synchronized illumination power variation functionality.

In accordance with another preferred embodiment of the present invention the portable telephone also includes an array of red, green, blue and infrared passing pixelwise elements arranged over the electronic imaging sensor. Additionally or alternatively, the portable telephone also includes a data entry template projector employed by the second imaging functionality. Preferably, the portable telephone also includes an illuminator employed by the second imaging functionality. Additionally or alternatively, the portable telephone also includes a synchronized illumination power variation functionality.

In accordance with another preferred embodiment of the present invention the digital personal assistant also includes an array of red, green, blue and infrared passing pixelwise elements arranged over the electronic imaging sensor. Additionally or alternatively, the digital personal assistant also includes a data entry template projector employed by the second imaging functionality. Preferably, the digital personal assistant also includes an illuminator employed by the second imaging functionality. Additionally or alternatively, the digital personal assistant also includes a synchronized illumination power variation functionality.

There is also provided in accordance with another preferred embodiment of the present invention an electronic camera including an electronic imaging sensor providing an output representing an imaged field and an array of red, green, blue and infrared passing pixelwise elements arranged over the electronic imaging sensor.

There is further provided in accordance with still another preferred embodiment of the present invention a portable telephone including telephone functionality, an electronic imaging sensor providing an output representing an imaged field and an array of red, green, blue and infrared passing pixelwise elements arranged over the electronic imaging sensor.

There is also provided in accordance with another preferred embodiment of the present invention a digital personal assistant including at least one personal digital assistant functionality, an electronic imaging sensor providing an output representing an imaged field and an array of red, green, blue and infrared passing pixelwise elements arranged over the electronic imaging sensor.

There is even further provided in accordance with yet another preferred embodiment of the present invention an electronic camera including an electronic imaging sensor providing an output representing an imaged field, a first imaging functionality employing the electronic imaging sensor in a visible radiation imaging mode for taking a picture of a scene in the imaged field and a second imaging functionality employing the electronic imaging sensor in an infrared radiation sensing mode for data entry responsive to user hand activity.

There is also provided in accordance with another preferred embodiment of the present invention a portable telephone including telephone functionality, an electronic imaging sensor providing an output representing an imaged field, a first imaging functionality employing the electronic imaging sensor in a visible radiation imaging mode for taking a picture of a scene in the imaged field and a second imaging functionality employing the electronic imaging sensor in an infrared radiation sensing mode for data entry responsive to user hand activity.

There is further provided in accordance with yet another preferred embodiment of the present invention a digital personal assistant including at least one personal digital assistant functionality, an electronic imaging sensor providing an output representing an imaged field, a first imaging functionality employing the electronic imaging sensor in a visible radiation imaging mode for taking a picture of a scene in the imaged field and a second imaging functionality employing the electronic imaging sensor in an infrared radiation sensing mode for data entry responsive to user hand activity.

In accordance with another preferred embodiment of the present invention the electronic camera includes an array of red, green, blue and infrared passing pixelwise elements arranged over the electronic imaging sensor.

In accordance with yet another preferred embodiment of the present invention the portable telephone includes an array of red, green, blue and infrared passing pixelwise elements arranged over the electronic imaging sensor.

In accordance with yet another preferred embodiment of the present invention the digital personal assistant includes an array of red, green, blue and infrared passing pixelwise elements arranged over the electronic imaging sensor.

Preferably, in the first imaging functionality output of the pixels underlying the red, green and blue passing elements are employed. Additionally, output of the pixels underlying the infrared passing elements is employed to prevent distortion of color response of the imaging sensor. Additionally, in the second imaging functionality output of the pixels underlying the infrared passing elements are employed.

In accordance with yet another preferred embodiment of the present invention the electronic camera also includes a processor. In accordance with still another preferred embodiment of the present invention the electronic camera forms part of a telephone. Alternatively, the electronic camera forms part of a personal digital assistant. Alternatively, the electronic camera forms part of a wristwatch.

In accordance with another preferred embodiment of the present invention the portable telephone also includes a processor.

In accordance with yet another preferred embodiment of the present invention the digital personal assistant also includes a processor.

In accordance with still another preferred embodiment of the present invention the processor includes the following functionality: as each pixel value is acquired, determining, using pixel coordinates, whether that pixel lies within a predefined keystroke region, acquiring pixel values for the pixel coordinates lying within the predefined keystroke region, adding or subtracting each of the pixel values to or from a pixel total maintained for each the keystroke region based on determining a pixel function of each pixel, comparing the pixel total for each the keystroke region with a current key actuation threshold, if the pixel total exceeds the key actuation threshold for a given keystroke region in a given frame and in the previous frame the pixel total did not exceed the key actuation threshold for that keystroke region, providing a key actuation output and if the pixel total does not exceed the key actuation threshold for a given keystroke region in a given frame and in the previous frame the pixel total did exceed the key actuation threshold for that keystroke region, providing a key deactuation output.

In accordance with another preferred embodiment of the present invention the determining whether that pixel lies within a predefined keystroke region is made by employing a pixel index table which indicates for each pixel, whether that pixel lies within a predetermined keystroke region and, if so, within which keystroke region it lies. Alternatively, both of the determining steps employ the pixel index table.

In accordance with yet another preferred embodiment of the present invention the pixel total is maintained for each keystroke region in a keystroke region accumulator table.

In accordance with still another preferred embodiment of the present invention the comparing employs a keystroke region threshold table.

In accordance with another preferred embodiment of the present invention the processor also includes the following functionality: once all of the pixels in a frame have been processed, determining an updated background level for a frame and determining a key actuation threshold for the keystroke region threshold table by subtracting the updated background level from a predetermined threshold level which is established for each keystroke region. Additionally, the pixel function includes adding the pixel values of a plurality of pixels in the keystroke region.

In accordance with yet another preferred embodiment of the present invention the processor is operative to determine the "center of gravity" of pixel values of pixels in the two-dimensional image sensor. Preferably, the processor includes the following functionality: as each pixel value is acquired, determining, using the pixel coordinates, whether that pixel lies within a predefined active region, acquiring pixel values for various pixel coordinates and determining the "center of gravity" of the pixel values.

In accordance with still another preferred embodiment of the present invention determining the "center of gravity" is achieved by multiplying the pixel values by X and Y values representing the geographic position of each pixel, summing the results along mutually perpendicular axes X and Y, summing the total of the pixel values for all relevant pixels for the active region and dividing the summed results by the total of the pixel values to determine the X and Y coordinates of the "center of gravity", which represents a desired engagement location.

Preferably, the pixel values are thresholded prior to summing thereof.

There is yet further provided in accordance with another preferred embodiment of the present invention a wristwatch including wristwatch functionality, an electronic imaging sensor providing an output representing an imaged field, a first imaging functionality employing the electronic imaging sensor for taking a picture of a scene in the imaged field, a second imaging functionality employing the electronic imaging sensor for data entry responsive to user hand activity and a user-operated imaging functionality selection switch operative to enable a user to select operation in one of the first and second imaging functionalities.

There is also provided in accordance with another preferred embodiment of the present invention a vehicle including a frame, a drive train and a chassis, including at least one lockable entry portal and portal unlocking functionality and an access control assembly for governing authorized access to the at least one lockable entry portal including at least one at least partially light transmissive user finger engagement surface accessible from outside the chassis, an illuminator operative to illuminate at least one user finger engagement plane adjacent the at least one user finger engagement surface, a two-dimensional imaging sensor viewing the at least one user finger engagement surface, from a location inwardly of the at least one finger engagement surface, for sensing light from the illuminator scattered by engagement of a user's finger with the at least one finger engagement surface, and a data entry processor receiving an output from the two-dimensional imaging sensor and providing a data entry input to the portal unlocking functionality.

There is further provided in accordance with yet another preferred embodiment of the present invention access control apparatus for use with a vehicle including a chassis having at least one lockable entry portal and portal unlocking functionality and also including at least one at least partially light transmissive user finger engagement surface accessible from outside the chassis, the access control apparatus including an illuminator operative to illuminate the at least one user finger engagement surface, a two-dimensional imaging sensor viewing the at least one user finger engagement surface from a location inwardly of the at least one finger engagement surface for sensing light from the illuminator scattered by engagement of a user's finger with the at least one finger engagement surface and a data entry processor receiving an output from the two-dimensional imaging sensor and providing a data entry input to the portal unlocking functionality.

There is further provided in accordance with yet another preferred embodiment of the present invention access control apparatus for use with an enclosure having at least one lockable entry portal and portal unlocking functionality and also including at least one at least partially light transmissive user finger engagement surface accessible from outside the enclosure, the access control apparatus including an illuminator operative to illuminate the at least one user finger engagement surface, a two-dimensional imaging sensor viewing the at least one user finger engagement surface from a location inwardly of the at least one finger engagement surface for sensing light from the illuminator scattered by engagement of a user's finger with the at least one finger engagement surface and a data entry processor receiving an output from the two-dimensional imaging sensor and providing a data entry input to the portal unlocking functionality.

There is yet further provided in accordance with still another preferred embodiment of the present invention data entry apparatus for use with at least one at least partially light transmissive user finger engagement surface, the data entry apparatus including an illuminator operative to illuminate the at least one user finger engagement surface, a two-dimensional imaging sensor viewing the at least one user finger engagement surface from a location inwardly of the at least one finger engagement surface for sensing light from the illuminator scattered by engagement of a user's finger with the at least one finger engagement surface and a data entry processor receiving an output from the two-dimensional imaging sensor and providing a data entry input.

Preferably, the illuminator is located at a location inwardly of the at least one engagement surface. Additionally or alternatively, the at least one finger engagement surface includes a one-dimensional array of a plurality of finger engagement surfaces. Alternatively, the at least one finger engagement surface includes a two-dimensional array of a plurality of finger engagement surfaces.

In accordance with another preferred embodiment of the present invention the vehicle also includes an illumination director cooperating with the illuminator for providing an illumination beam generally parallel to the at least one finger engagement surface.

In accordance with yet another preferred embodiment of the present invention the access control apparatus also includes an illumination director cooperating with the illuminator for providing an illumination beam generally parallel to the at least one finger engagement surface.

In accordance with still another preferred embodiment of the present invention the data entry apparatus also includes an illumination director cooperating with the illuminator for providing an illumination beam generally parallel to the at least one finger engagement surface.

Preferably, the illumination director includes a prism.

There is also provided in accordance with another preferred embodiment of the present invention data entry apparatus for use with at least one engagement surface, the data entry apparatus including a light emitting data entry engagement element, which emits light only when it is in at least predetermined propinquity to the at least one engagement surface, a two-dimensional imaging sensor viewing the at least one engagement surface for sensing light emitted by the light emitting data entry engagement element and a data entry processor receiving an output from the two-dimensional imaging sensor and providing a data entry input.

Preferably, the light emitting data entry engagement element includes an elongated element having an LED at an end thereof. Additionally, the LED includes an IR emitting LED. Additionally or alternatively, the data entry apparatus also includes a proximity switch.

There is further provided in accordance with yet another preferred embodiment of the present invention data entry apparatus for use with at least one engagement surface, the data entry apparatus including a projector operative to illuminate the at least one engagement surface and to define thereon at least one touchpad region and at least one keyboard region, the touchpad region being defined by a zero'th order diffracted image, an illuminator operative to illuminate the at least one engagement surface, a two-dimensional imaging sensor viewing the at least one engagement surface from a location inwardly of the at least one engagement surface for sensing light from the illuminator scattered by engagement of a user's finger with the at least one engagement surface and a data entry processor receiving an output from the two-dimensional imaging sensor and providing a data entry input.

Preferably, the processor includes the following functionality: as each pixel value is acquired, determining, using pixel coordinates, whether that pixel lies within a predefined keystroke region, acquiring pixel values for the pixel coordinates lying within the predefined keystroke region, adding or subtracting each of the pixel values to or from a pixel total maintained for each the keystroke region based on determining a pixel function of each pixel, comparing the pixel total for each the keystroke region with a current key actuation threshold, if the pixel total exceeds the key actuation threshold for a given keystroke region in a given frame and in the previous frame the pixel total did not exceed the key actuation threshold for that keystroke region, providing a key actuation output and if the pixel total does not exceed the key actuation threshold for a given keystroke region in a given frame and in the previous frame the pixel total did exceed the key actuation threshold for that keystroke region, providing a key deactuation output.

There is even further provided in accordance with still another preferred embodiment of the present invention a data input device including an illuminator operative to illuminate at least one engagement plane by directing light along the at least one engagement plane, a two-dimensional imaging sensor, including an optical wedge element, viewing the at least one engagement plane from a location outside the at least one engagement plane for sensing light from the illuminator scattered by engagement of a data entry object with the at least one engagement plane and a data entry processor receiving an output from the two-dimensional imaging sensor and providing a data entry input to utilization circuitry.

Preferably, the optical wedge element enables the imaging sensor to efficiently sense light from the engagement plane.

There is still further provided in accordance with yet another preferred embodiment of the present invention a data input device including an illuminator operative to illuminate at least one engagement plane by directing light along the at least one engagement plane, a two-dimensional imaging sensor, including a pair of oppositely oriented optical wedge elements, viewing the at least one engagement plane from a location outside the at least one engagement plane for sensing light from the illuminator scattered by engagement of a data entry object with the at least one engagement plane and a data entry processor receiving an output from the two-dimensional imaging sensor and providing a data entry input to utilization circuitry.

There is also provided in accordance with still another preferred embodiment of the present invention a data input device including an illuminator operative to illuminate at least one engagement plane by directing light along the at least one engagement plane and to illuminate a proper positioning confirmation location on an engagement surface, a two-dimensional imaging sensor, including, viewing the at least one engagement plane from a location outside the at least one engagement plane for sensing light from the illuminator scattered by engagement of a data entry object with the at least one engagement plane and a data entry processor receiving an output from the two-dimensional imaging sensor and providing a data entry input to utilization circuitry.

Preferably, the imaging sensor senses the presence or absence of illumination at the proper positioning confirmation location. Additionally, the data entry apparatus is operative to unpower itself when the imaging sensor senses the absence of illumination at the proper positioning confirmation location.

There is further provided in accordance with yet another preferred embodiment of the present invention gaming apparatus including at least one game piece, a game template projector, operative to project a game template onto a surface, an illuminator operative to illuminate the surface and an imaging sensor viewing the surface for sensing light from the illuminator reflected by at least one optically encoded reflector mounted on the at least one game piece.

In accordance with another preferred embodiment of the present invention each of the at least one reflector identifies one of the at least one game piece and is operative to indicate a location of the at least one game piece on the game template. Additionally or alternatively, the at least one reflector also identifies a spatial orientation of the game piece.

BRIEF DESCRIPTION OF THE DRAWINGS

The present invention will be understood and appreciated more fully from the following detailed description, taken in conjunction with the drawings in which:

FIGS. 11A, 11B and 11C are simplified illustrations of three alternative methodologies for determining the function of the pixel within the keystroke region in which it lies as shown in FIG. 7;

FIGS. 12A, 12B and 12C are simplified illustrations of traces which are useful in understanding FIGS. 11A, 11B and 11C;

FIG. 22 is a simplified pictorial illustration of data entry apparatus constructed and operative in accordance with another preferred embodiment of the present invention;

FIG. 23 is a simplified pictorial illustration of gaming apparatus constructed and operative in accordance with a preferred embodiment of the present invention; and FIG. 24 is a simplified pictorial illustration of gaming apparatus constructed and operative in accordance with another preferred embodiment of the present invention.

DETAILED DESCRIPTION OF PREFERRED EMBODIMENTS

Figure 1A:
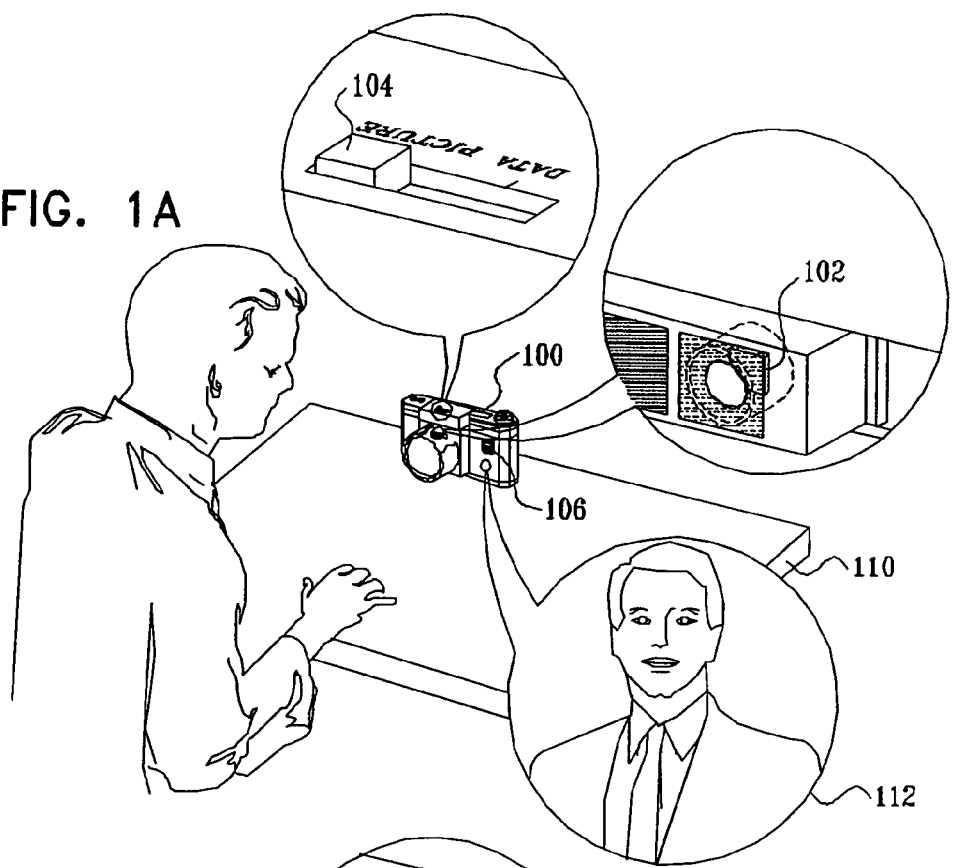
FIGS. 1A & 1B are simplified pictorial illustrations of an electronic camera constructed and operative in accordance with a preferred embodiment of the present invention in two different modes of operation.
Figure 1B:
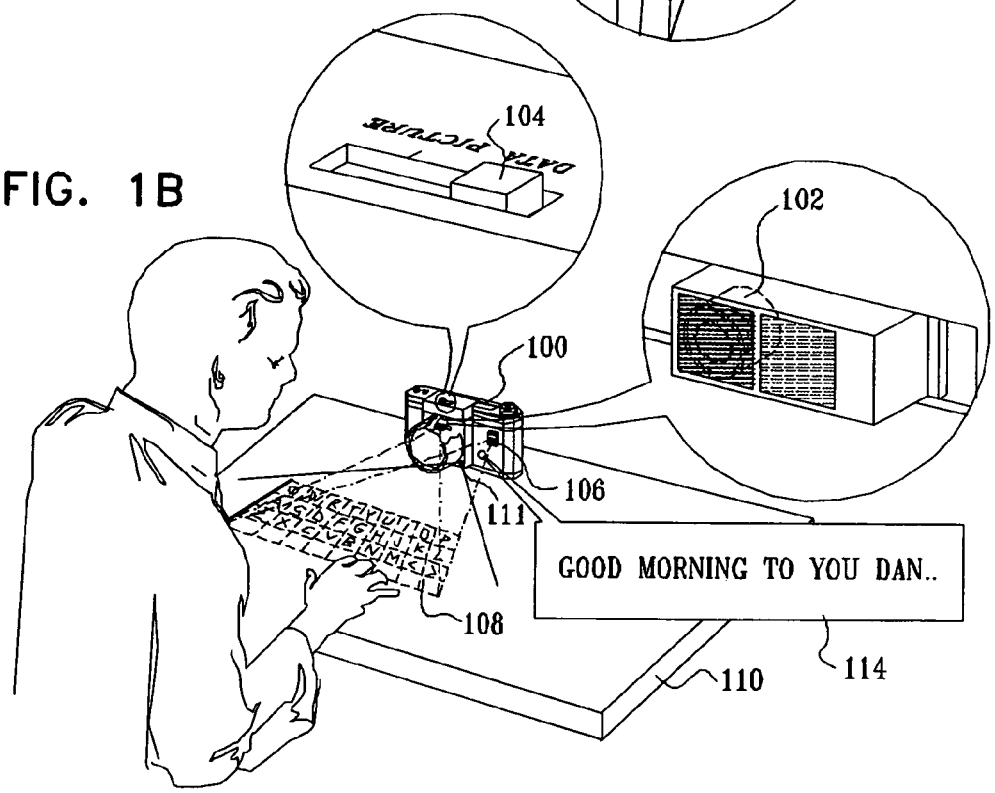

Reference is now made to FIGS. 1A & 1B, which are simplified pictorial illustrations of an electronic camera constructed and operative in accordance with a preferred embodiment of the present invention in two different modes of operation. As seen in FIGS. 1A & 1B, an electronic camera 100, which may be of conventional construction other than as specifically described hereinbelow, such as a Nikon COOLPIX 5700, available from Nikon Corporation, Tokyo, Japan, is equipped with an electronic imaging sensor module 102, which may include a CMOS array, for example, CMOS array OVT6130, available from Omnivision Technologies, Inc., 1341 Orleans Drive, Sunnyvale, Calif., USA, providing an output representing an imaged field.

A user-operated imaging functionality selection switch 104 is preferably provided to enable a user to select operation in one of two possible imaging functionalities. In a first imaging functionality, illustrated in FIG. 1A, the electronic imaging sensor module 102 is employed to take a picture of a scene in the imaged field. In a second imaging functionality, illustrated in FIG. 1B, the electronic imaging sensor module 102 is employed for data entry responsive to user hand activity.

Various embodiments of the first and second imaging functionalities will be described hereinbelow, with reference to FIGS. 4A-5B. Preferably, but not necessarily, the second imaging functionality, as shown in FIG. 1B, employs a data entry template projector 106, which projects a data entry template, such as that designated by reference numeral 108, onto a surface, such as a table surface 110. An illuminator 111 preferably is provided and is operative to illuminate a region adjacent the data entry template 108. The imaging sensor module 102 views the data entry template region for sensing light from the illuminator 111. The second imaging functionality also preferably incorporates processing functionality, an example of which is described in applicant's Published PCT Application WO 02/054169 A2, the disclosure of which is hereby incorporated by reference.

It is seen in FIG. 1A that when the electronic camera 100 is operative in the first imaging functionality, also termed a picture mode, a digital picture 112 is provided. Similarly, it is seen in FIG. 1B that when the electronic camera 100 is operative in the second imaging functionality, also termed a data mode, a stream of data 114 is provided.

Figure 2A:
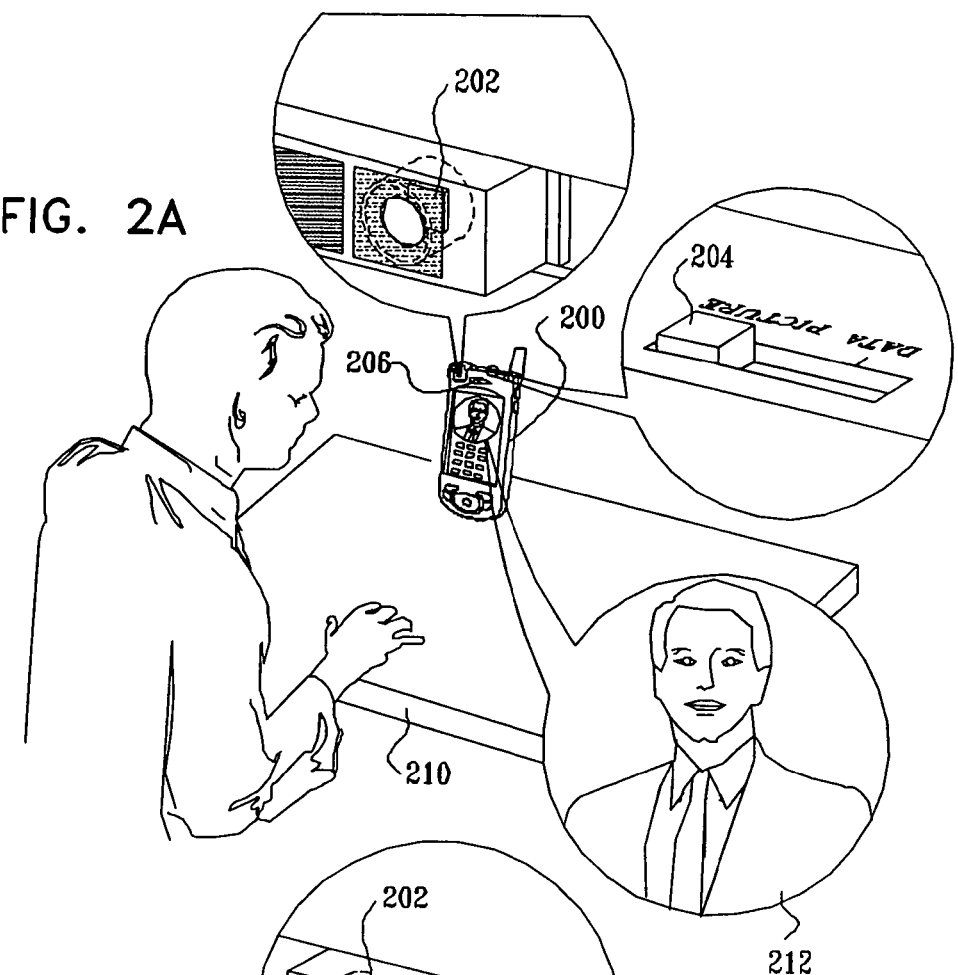
FIGS. 2A & 2B are simplified pictorial illustrations of a camera-equipped cellular telephone, constructed and operative in accordance with a preferred embodiment of the present invention in two different modes of operation.
Figure 2B:
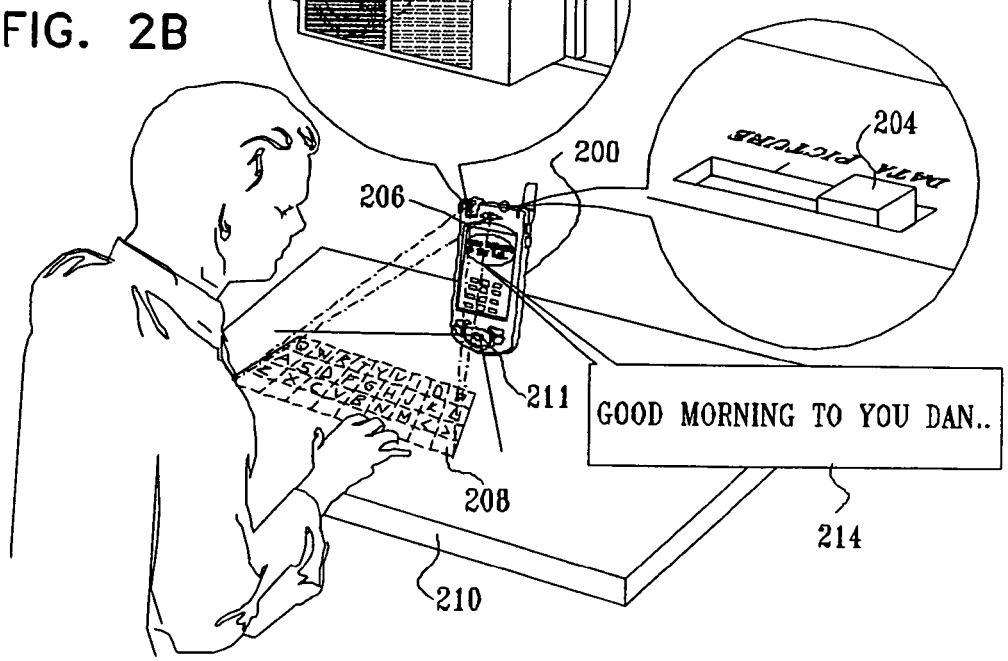

Reference is now made to FIGS. 2A & 2B, which are simplified pictorial illustrations of a camera-equipped cellular telephone, constructed and operative in accordance with a preferred embodiment of the present invention in two different modes of operation. As seen in FIGS. 2A & 2B, a camera-equipped cellular telephone 200, which may be of conventional construction other than as specifically described hereinbelow, such as a Samsung SPH-I330, available from Samsung Electronics, Seoul, Korea, is equipped with an electronic imaging sensor module 202, which may include a CMOS array, for example, CMOS array OVT6130, available from Omnivision Technologies, Inc., 1341 Orleans Drive, Sunnyvale, Calif., USA, providing an output representing an imaged field.

A user-operated imaging functionality selection switch 204 is preferably provided to enable a user to select operation in one of two possible imaging functionalities. In a first imaging functionality, illustrated in FIG. 2A, the electronic imaging sensor module 202 is employed to take a picture of a scene in the imaged field. In a second imaging functionality, illustrated in FIG. 2B, the electronic imaging sensor module 202 is employed for data entry responsive to user hand activity.

Various embodiments of the first and second imaging functionalities will be described hereinbelow, with reference to FIGS. 4A-5B. Preferably, but not necessarily, the second imaging functionality, as shown in FIG. 2B, employs a data entry template projector 206, which projects a data entry template, such as that designated by reference numeral 208, onto a surface, such as a table surface 210. An illuminator 211 preferably is provided and is operative to illuminate a region adjacent the data entry template 208. The imaging sensor module 202 views the data entry template region for sensing light from the illuminator 211. The second imaging functionality also preferably incorporates processing functionality an example of which is described in applicant's Published PCT Application WO 02/054169 A2, the disclosure of which is hereby incorporated by reference.

It is seen in FIG. 2A that when the camera-equipped cellular telephone 200 is operative in the first imaging functionality, also termed a picture mode, a digital picture 212 is provided. Similarly, it is seen in FIG. 2B that when the camera-equipped cellular telephone 200 is operative in the second imaging functionality, also termed a data mode, a stream of data 214 is provided.

Figure 3A:
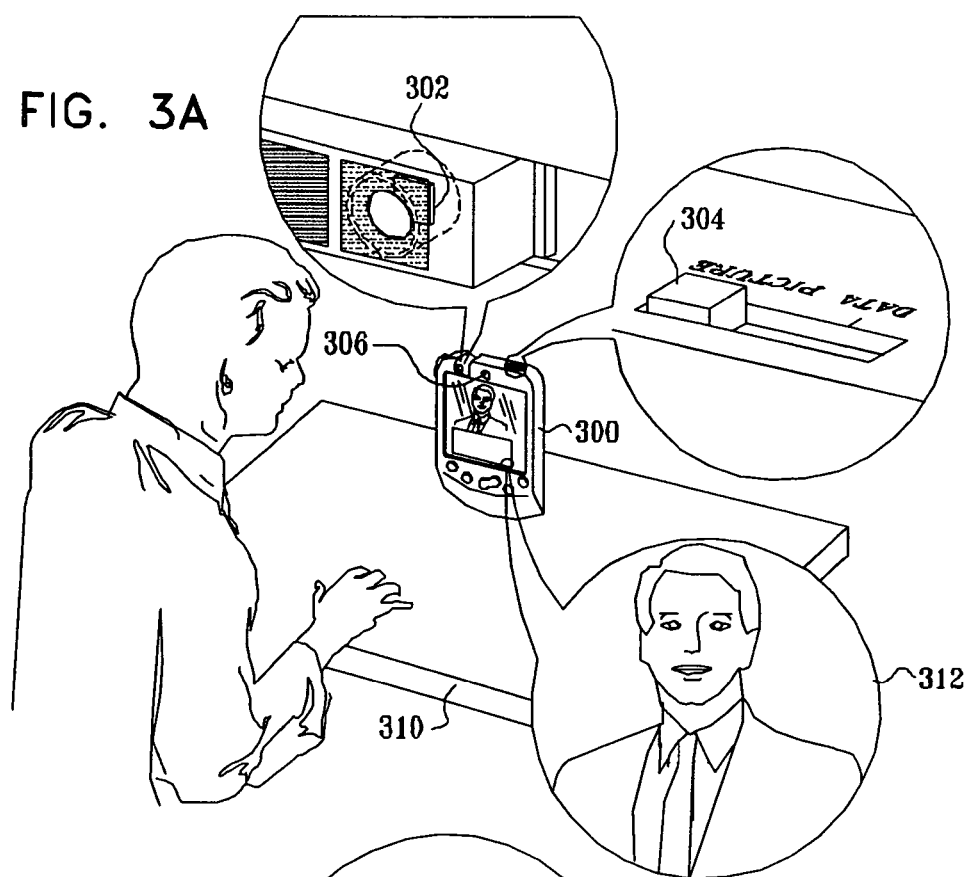
FIGS. 3A & 3B are simplified pictorial illustrations of a camera-equipped personal digital assistant, constructed and operative in accordance with a preferred embodiment of the present invention in two different modes of operation.
Figure 3B:
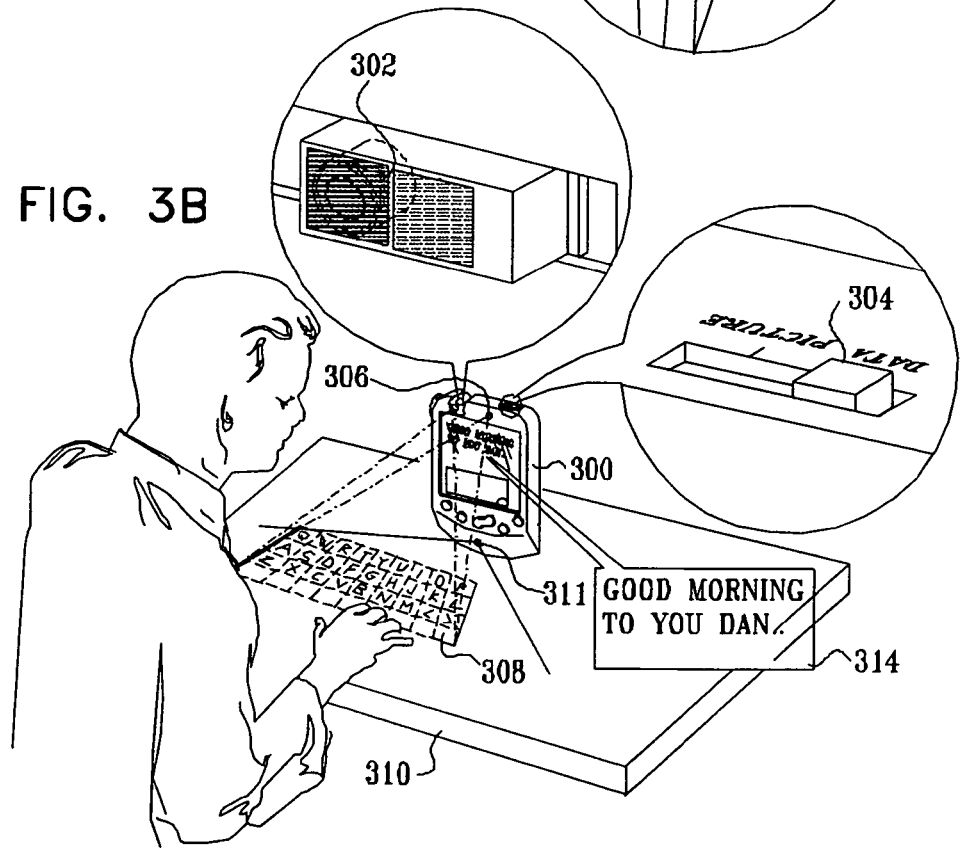

Reference is now made to FIGS. 3A & 3B, which are simplified pictorial illustrations of a camera-equipped personal digital assistant, constructed and operative in accordance with a preferred embodiment of the present invention in two different modes of operation. As seen in FIGS. 3A & 3B, a camera-equipped personal digital assistant 300, which may be of conventional construction other than as specifically described hereinbelow, such as a Samsung SPH-I700, available from Samsung Electronics, Seoul, Korea, is equipped with an electronic imaging sensor module 302, which may include a CMOS array, for example, CMOS array OVT6130, available from Omnivision Technologies, Inc., 1341 Orleans Drive, Sunnyvale, Calif., USA, providing an output representing an imaged field.

A user-operated imaging functionality selection switch 304 is preferably provided to enable a user to select operation in one of two possible imaging functionalities. In a first imaging functionality, illustrated in FIG. 3A, the electronic imaging sensor module 302 is employed to take a picture of a scene in the imaged field. In a second imaging functionality, illustrated in FIG. 3B, the electronic imaging sensor module 302 is employed for data entry responsive to user hand activity.

Various embodiments of the first and second imaging functionalities will be described hereinbelow, with reference to FIGS. 4A-5B. Preferably, but not necessarily, the second imaging functionality, as shown in FIG. 3B, employs a data entry template projector 306, which projects a data entry template, such as that designated by reference numeral 308, onto a surface, such as a table surface 310. An illuminator 311 preferably is provided and is operative to illuminate a region adjacent the data entry template 308. The imaging sensor module 302 views the data entry template region for sensing light from the illuminator 311. The second imaging functionality also preferably incorporates processing functionality an example of which is described in applicant's Published PCT Application WO 02/054169 A2, the disclosure of which is hereby incorporated by reference.

It is seen in FIG. 3A that when the electronic camera 300 is operative in the first imaging functionality, also termed a picture mode, a digital picture 312 is provided. Similarly, it is seen in FIG. 3B that when the electronic camera 300 is operative in the second imaging functionality, also termed a data mode, a stream of data 314 is provided.

Figure 4A:
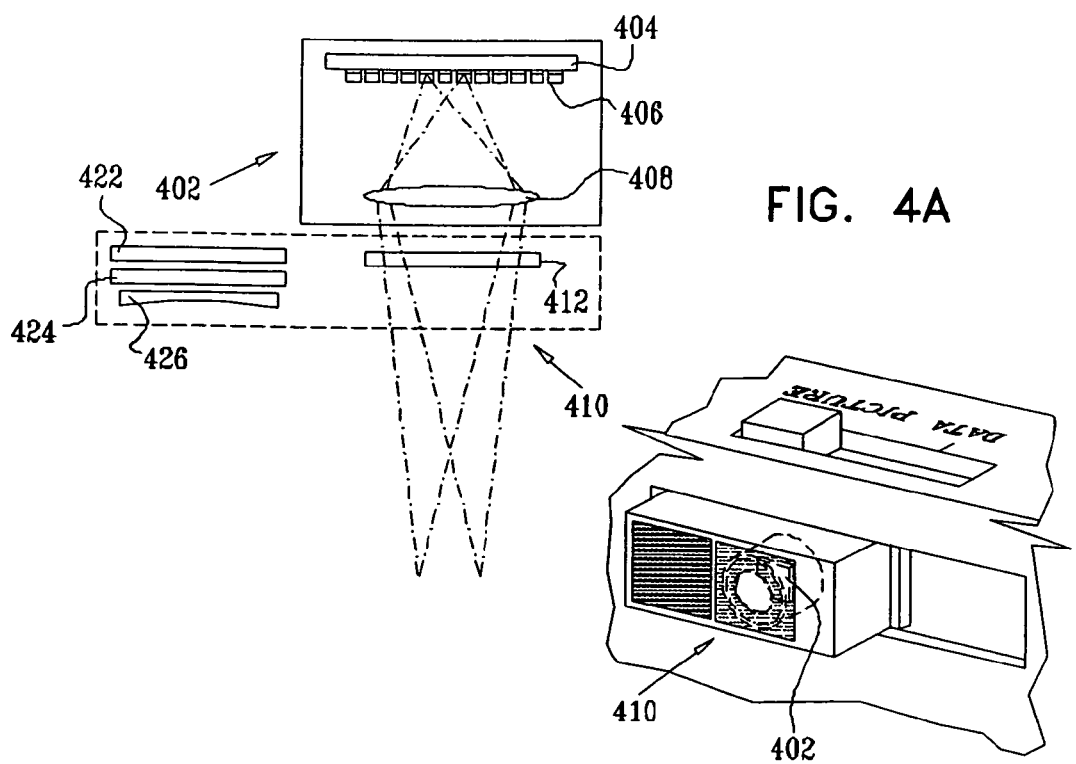
FIGS. 4A & 4B are simplified diagrammatic illustrations of the operation of imaging functionality selection in accordance with a preferred embodiment of the present invention in two different modes of operation.
Figure 4B:
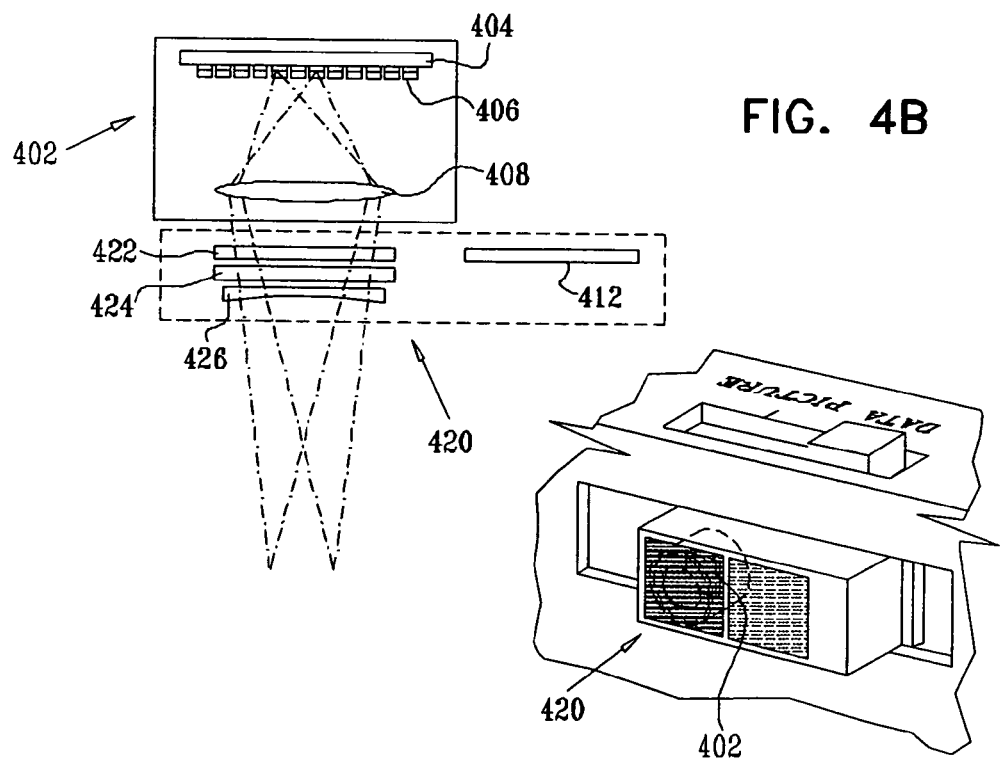

Reference is now made to FIGS. 4A & 4B, which are simplified diagrammatic illustrations of the operation of imaging functionality selection in accordance with a preferred embodiment of the present invention in two different modes of operation. As seen in FIGS. 4A & 4B, one implementation of the invention involves the use of a first and second selectably positionable optical assemblies which may be selectably placed in front of an electronic imaging sensor module 402.

In the illustrated embodiment, the sensor module 402 comprises a two-dimensional CMOS detector array 404 which is overlaid by an array of color filters 406, which pass infrared radiation. A lens 408 focuses light from an imaging field onto array 404.

FIG. 4A shows a first selectably positionable optical assembly 410, preferably comprising an IR blocking filter 412, aligned with lens 408. The imaging functionality of FIG. 4A is suitable for picture taking, since it prevents IR radiation from distorting the color response of the sensor module 402.

FIG. 4B shows a second selectably positionable optical assembly 420, preferably comprising a visible radiation blocking filter 422, an IR band pass filter 424 and a field lens 426, aligned with lens 408. The imaging functionality of FIG. 4B is suitable for data input, since it allows only a relatively narrow band of IR radiation to reach the sensor module 402 from a relatively wide field of view.

Figure 5A:
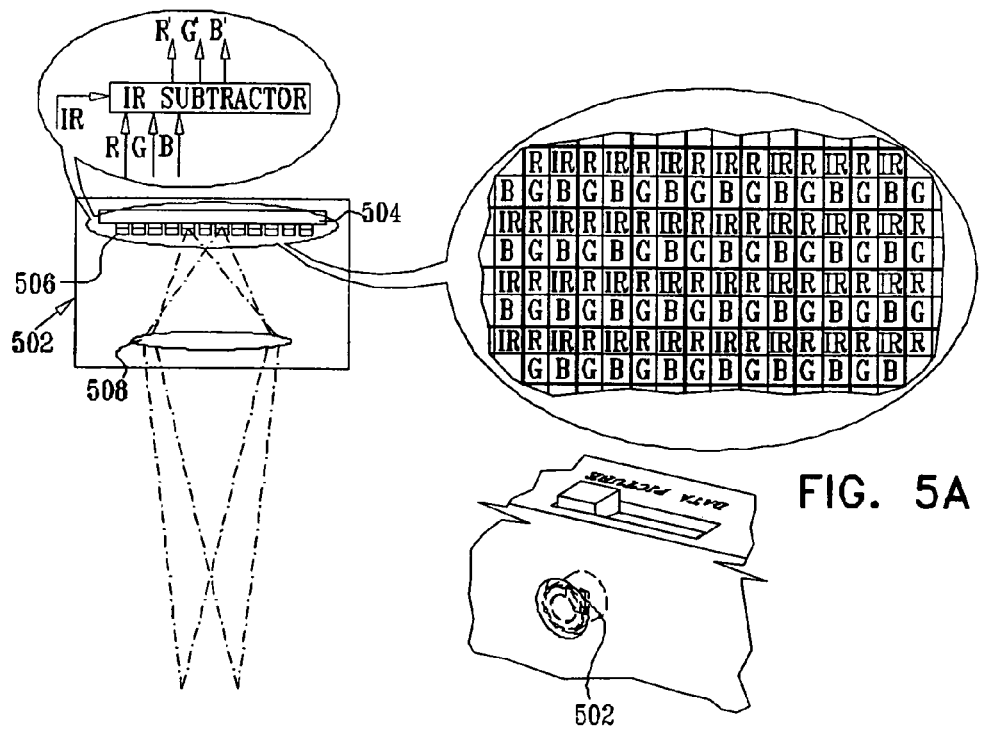
FIGS. 5A & 5B are simplified diagrammatic illustrations of the operation of imaging functionality selection in accordance with another preferred embodiment of the present invention in two different modes of operation.
Figure 5B:
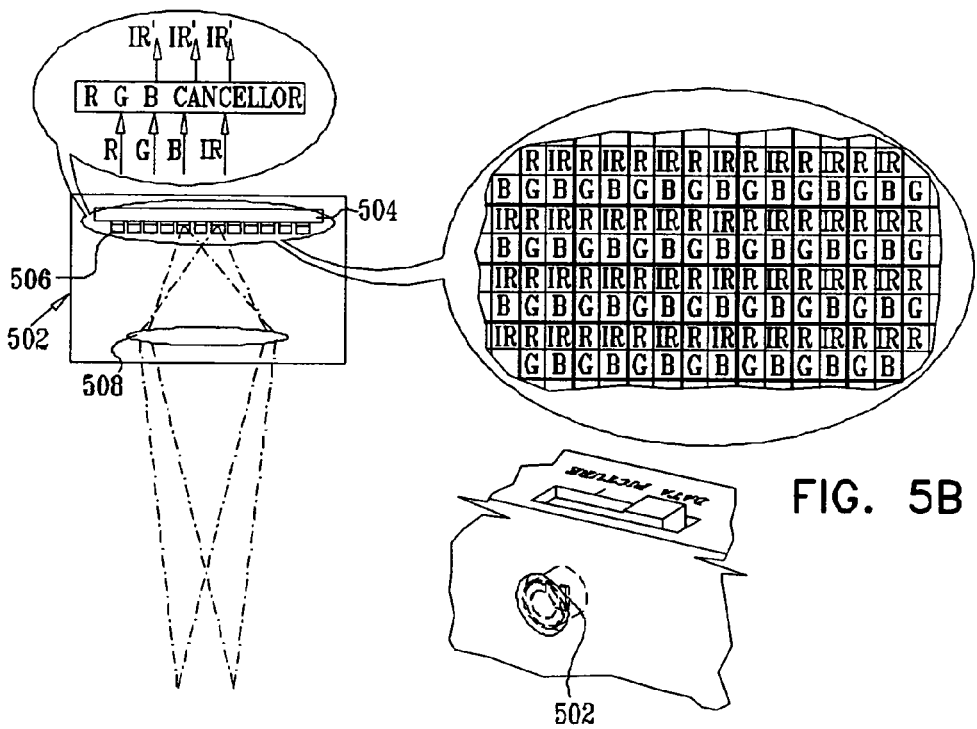

Reference is now made to FIGS. 5A & 5B, which are simplified diagrammatic illustrations of the operation of imaging functionality selection in accordance with another preferred embodiment of the present invention in two different modes of operation. In this embodiment, imaging functionality selection is effected electronically, without the need for mechanically movable optical elements.

As seen in FIGS. 5A & 5B, this implementation of the invention involves the use of an electronic imaging sensor module 502 including a CMOS detector array 504 overlaid with a repeating array of pixelwise selective light transmissive filters 506 characterized in that the array includes red (R), green (G), blue (B) and infrared (IR) transmissive filters. A lens 508 focuses light from an imaging field onto detector array 504.

FIG. 5A shows the imaging functionality of the embodiment of FIGS. 5A and 5B in a picture taking mode, wherein only the outputs of the pixels underlying the R, G and B filters are employed and the respective IR content of the outputs of each of the pixels underlying the R, G and B filters is subtracted therefrom. This color processing prevents IR radiation from distorting the color response of the sensor module 502.

FIG. 5B shows the imaging functionality of the embodiment of FIGS. 5A and 5B in a data entry mode, wherein only the outputs of the pixels underlying the IR filters are employed.

Figure 6:
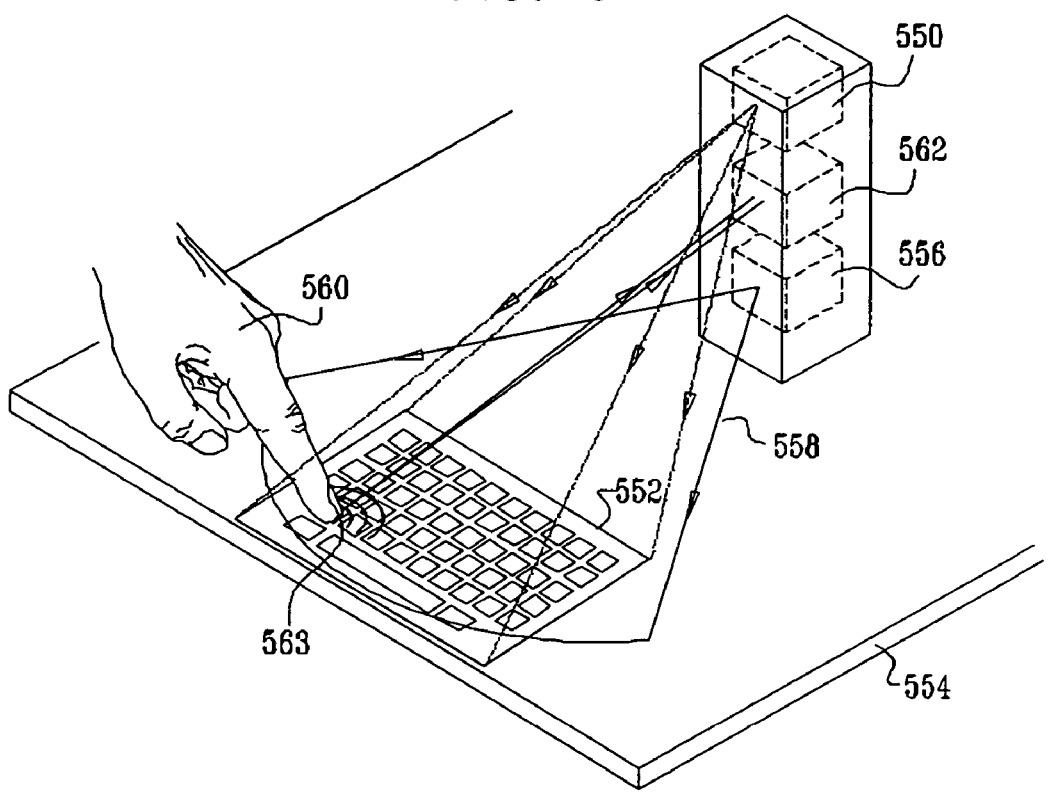
FIG. 6 is a simplified diagrammatic illustration of a data entry object engagement location sensing subsystem useful in the embodiments of any of FIGS. 1A-5B.

Reference is now made to FIG. 6, which is a simplified and generalized illustration of a projection keyboard system and methodology which is preferably incorporated into the embodiments of FIGS. 1A-5B in accordance with a preferred embodiment of the present invention. A projection subsystem 550, preferably including a solid state light source (not shown) which illuminates a spatial light modulation element (not shown), defines an image 552 of a keyboard on a projection surface 554, preferably an inert surface, such as a desktop.

An illumination subsystem 556, preferably including a solid state light source (not shown), directs light in a radially directed illumination pattern 558, which preferably extends in a plane generally parallel to the projection surface 554. It is appreciated that the radially directed illumination pattern 558 has a very narrow spread in the direction generally perpendicular to the projection surface 554. It is further appreciated that the radially directed illumination pattern 558 is preferably located very close to the projection surface 554.

Impingement of light in the radially directed illumination pattern 558 on a data entry object 560, such as a user's finger, a stylus or other implement, causes light to be scattered or reflected therefrom. It is appreciated that the light is only scattered or reflected when the data entry object 560 is in close contact with the keyboard 552 defined on projection surface 554.

A detection subsystem 562, preferably employing a solid state imaging sensor (not shown) incorporated in a camera in the embodiments of FIGS. 1A-5B, receives light reflected or scattered from data entry object 560. The received light is mapped onto the imaging sensor with respect to a representation of the keyboard for associating the location of the data entry object 560 sensed by detection subsystem 562 with a key location 563 on the keyboard 552. Thus, the sensed location of data entry object 560 indicates which key of the keyboard 552 is being engaged.

Figure 7:
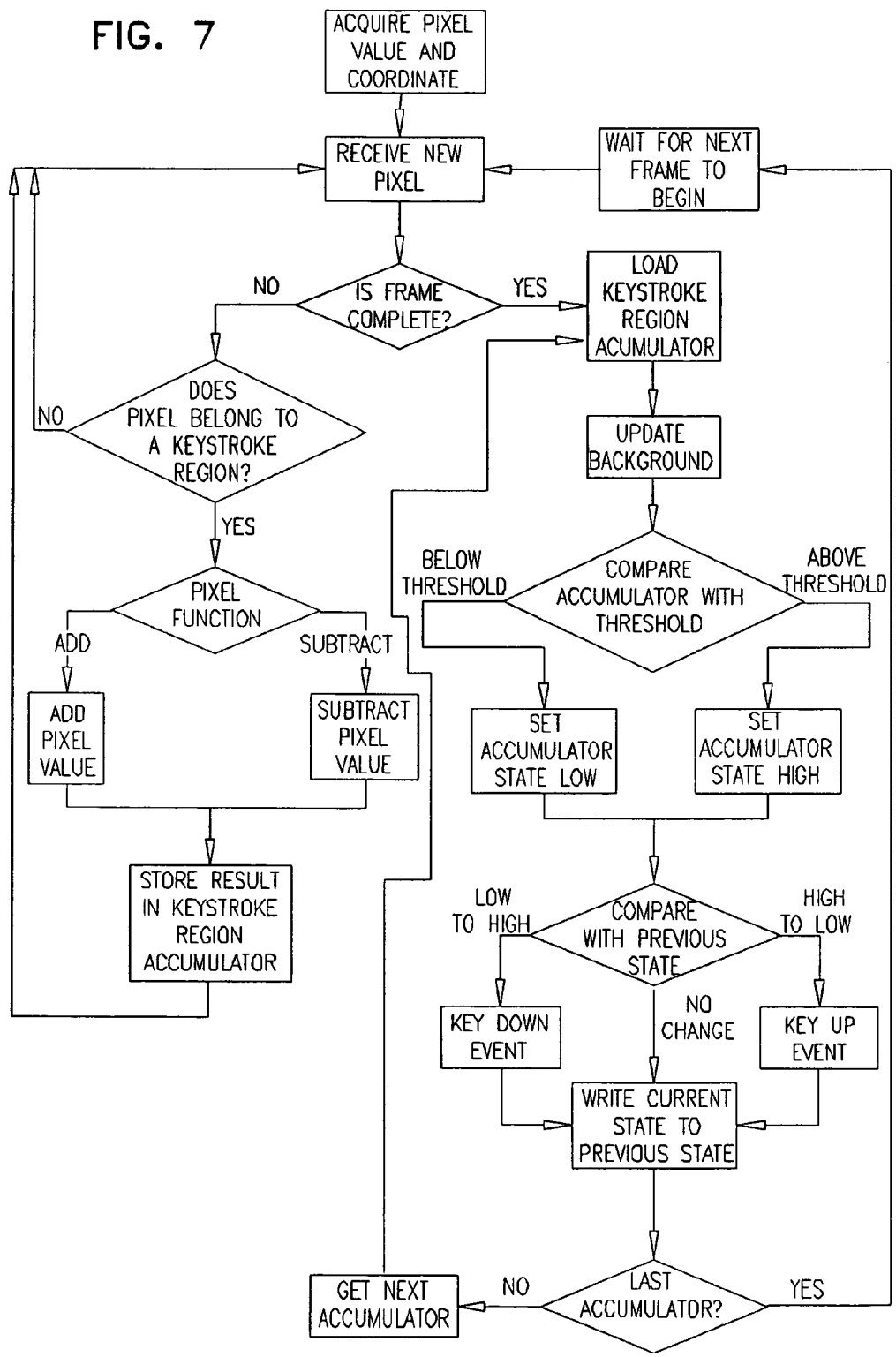
FIG. 7 is a simplified flow chart illustrating operation of the data entry object engagement location sensing subsystem of FIG. 6 in accordance with a preferred embodiment of the present invention.
Figure 8:
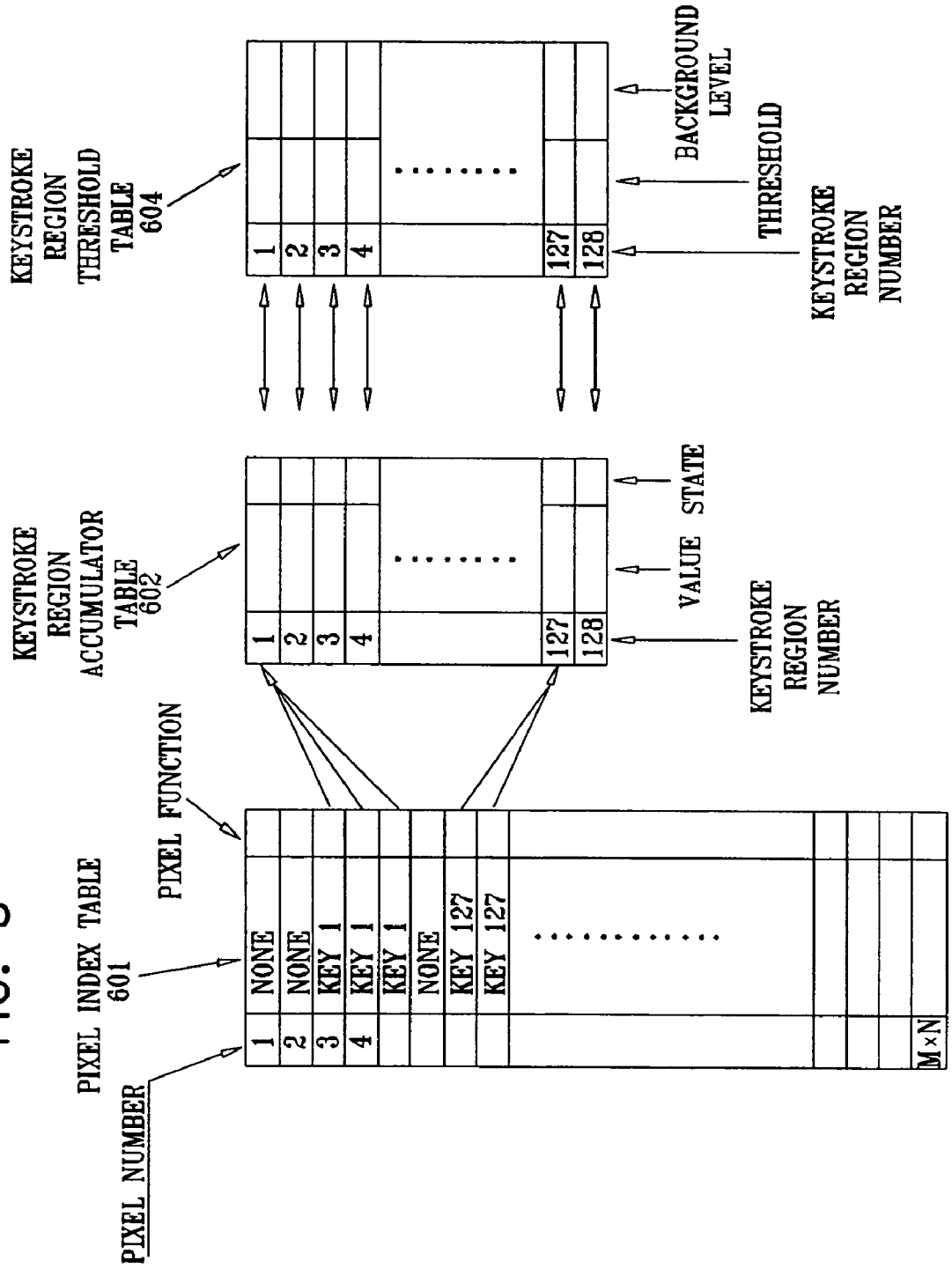
FIG. 8 is a simplified illustration of a preferred data structure employed in the operation of the data entry object engagement location sensing subsystem shown in FIG. 7.

Reference is now made to FIG. 7, which is a simplified flow chart illustrating operation of a data entry object engagement location sensing subsystem of FIG. 6 in accordance with a preferred embodiment of the present invention, and to FIG. 8, which is a simplified illustration of a preferred data structure employed in the operation of the data entry object engagement location sensing subsystem shown in FIG. 7.

FIG. 8 shows a simplified illustration of a preferred data structure employed in the operation of the data entry object engagement location sensing method described hereinbelow with respect to FIG. 7. It is appreciated that the imaging sensor of a camera, such as camera 100 (FIG. 1A), is typically comprised of a set of M×N pixels, wherein a particular group of pixels views a defined region of the engagement plane which preferably overlies the projection surface 110 (FIG. 1A). Thus, it is possible that a particular pixel group, located in the image plane of the camera 100, may receive scattered light from a data entry object 560 (FIG. 6) engaging the key location 563 (FIG. 6).

Thus, as the camera 100 views the projection surface 110, each of the M×N pixels in the image plane of the camera 100 may receive light from a corresponding region in the engagement plane in respect of a data entry object engagement therewith.

As seen in FIG. 7, pixel values, such as gray level values, are acquired for various pixel coordinates. As each pixel value is acquired, a determination is made, using the pixel coordinates, as to whether that pixel lies within a predefined keystroke region, such as keystroke regions 600 shown in FIG. 9. This determination is preferably made by employing a pixel index table 601 which indicates, for each pixel, whether that pixel lies within a predetermined keystroke region, such as keystroke regions 605, 606, 607 and 608 (FIG. 9), and, if so, within which keystroke region it lies.

The function of the pixel within the keystroke region in which it lies is then determined, preferably by employing table 601. This function is typically additive or subtractive, but may alternatively have another function. Typically, depending on the function, the pixel value is added to or subtracted from a pixel total maintained for each keystroke region in a keystroke region accumulator table 602.

Once all of the pixels in a frame have been processed as aforesaid, an updated background level is determined for the frame and a key actuation threshold is determined typically by subtracting the updated background level from a predetermined threshold level which is established for each keystroke region. This is preferably carried out by employing a keystroke region threshold table 604.

The contents of the keystroke region accumulator table 602 for each keystroke region preferably are then compared with the current key actuation threshold. If the contents of the accumulator table 602 exceed the key actuation threshold for a given key actuation region in a given frame and in the previous frame the contents of the accumulator table 602 did not exceed the key actuation threshold, a key actuation output is provided.

Similarly, if the contents of the accumulator table 602 do not exceed the key actuation threshold for a given key actuation region in a given frame and in the previous frame the contents of the accumulator table 602 did exceed the key actuation threshold, a key deactuation output is provided. In all other cases, no output need be generated.

Figure 9:
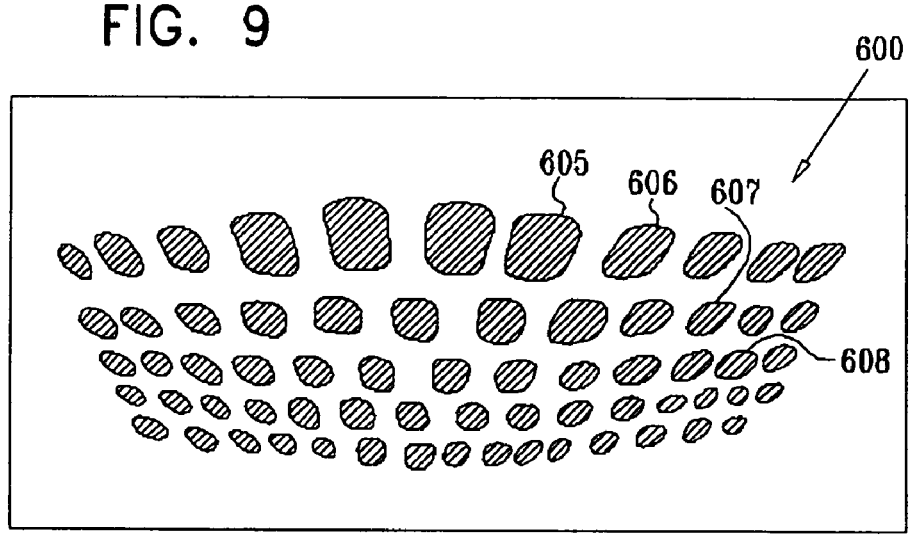
FIG. 9 is a simplified pictorial illustration of outlines of typical keystroke regions as sensed by a two-dimensional image sensor viewing a keyboard, such as the keyboard seen in FIG. 6.

Reference is now made to FIG. 9, which is a simplified pictorial illustration of outlines of typical keystroke regions 605, 606, 607 and 608 as sensed by a two-dimensional image sensor (FIG. 6) viewing a keyboard, such as the keyboard 552, seen in FIG. 6.

Figure 10:
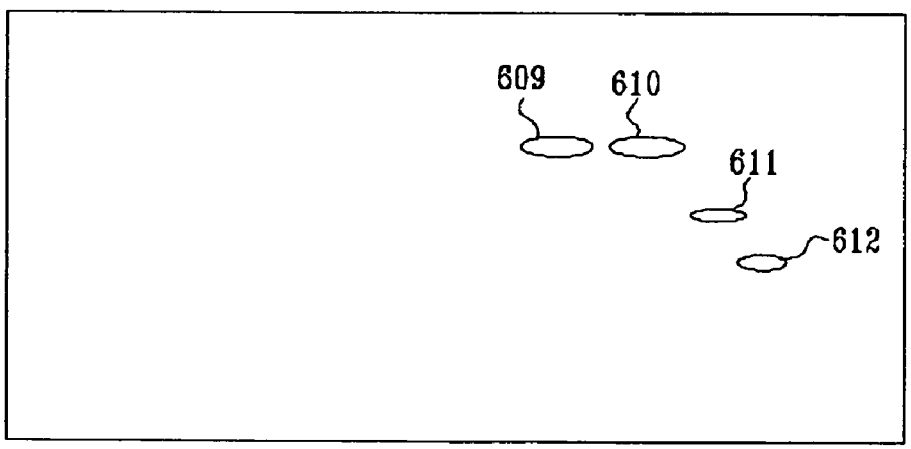
FIG. 10 is a simplified pictorial illustration of outlines of typical footprints of a typical light pattern occasioned by data entry object engagement with several keystroke regions, such as those shown in FIG. 9.

Reference is now made to FIG. 10, which is a simplified pictorial illustration of outlines of typical footprints 609, 610, 611 and 612 of a typical light pattern occasioned by data entry object engagement corresponding to the keystroke regions 605, 606, 607 and 608 (FIG. 9).

Figure 11A:
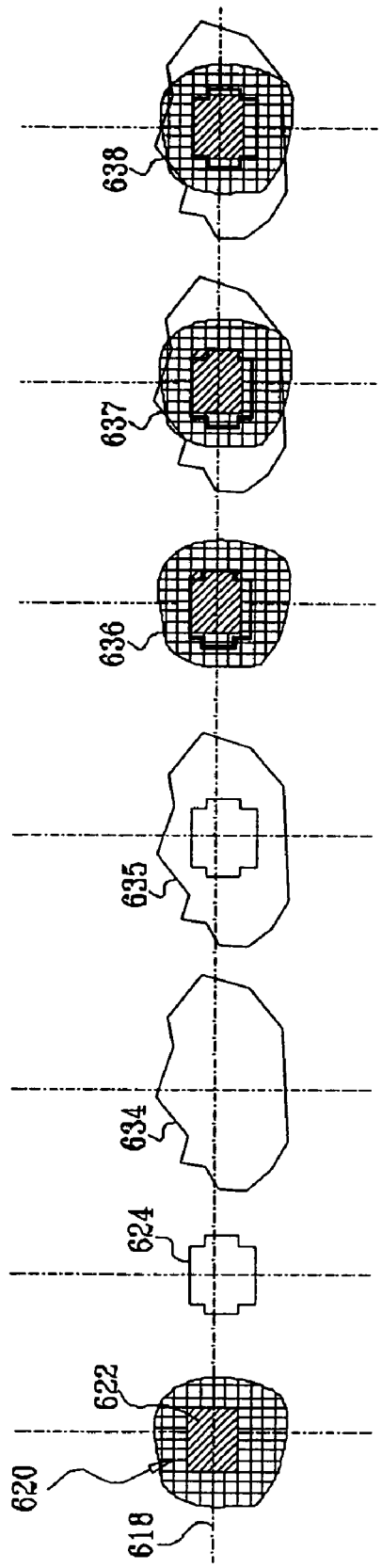
Figure 12A:
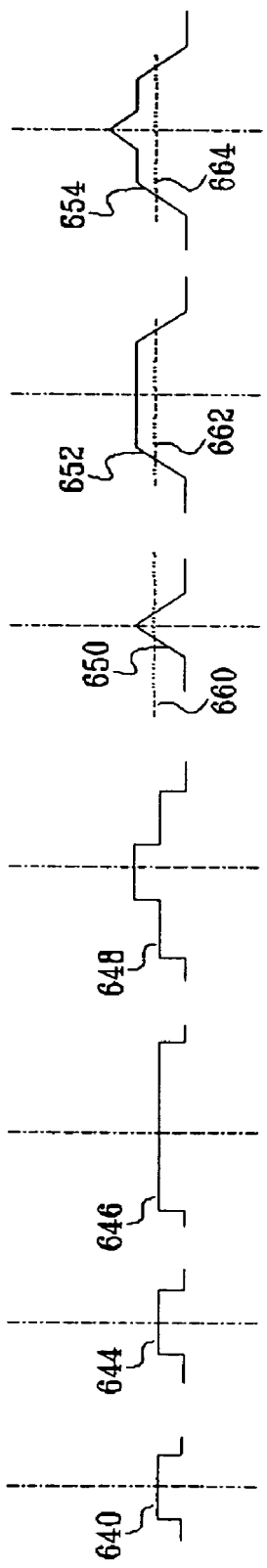
Figure 11B:
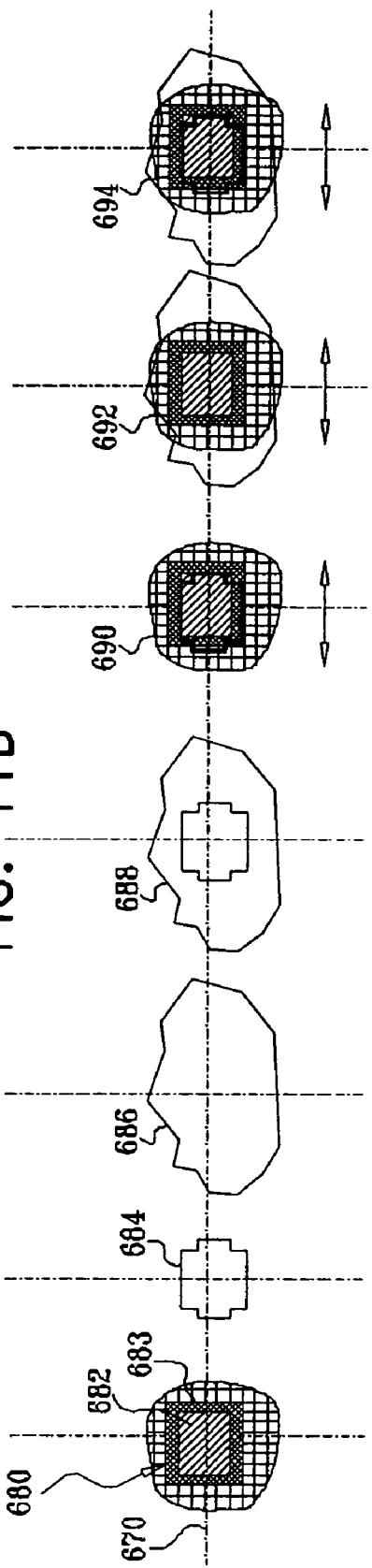
Figure 12B:
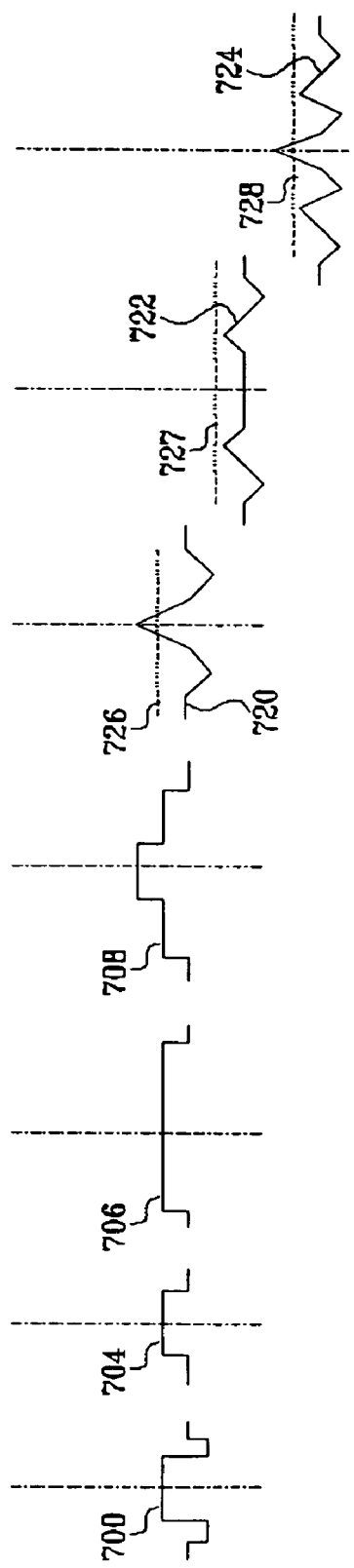

Reference is now made to FIGS. 11A, 11B and 11C, which are simplified illustrations of three alternative methodologies for determining the function of the pixel within the keystroke region in which it lies as shown in FIG. 8, and to FIGS. 12A, 12B and 12C, which are simplified illustrations of traces which are useful in understanding FIGS. 11A, 11B and 11C.

Turning now to FIG. 1A, there is shown arranged along a common arbitrary axis 618 a simplified keystroke region 620 corresponding to a given key and containing a plurality of pixels 622. A typical simplified footprint of a typical light pattern occasioned by data entry object engagement with the given key is indicated by reference numeral 624. FIG. 10 shows outlines of typical footprints 609, 610, 611 and 612, corresponding to keystroke regions designated 605, 606, 607 and 608 in FIG. 9.

A typical background signal pattern is indicated by reference numeral 634. Superimposition of the footprint 624 over the background signal pattern 634 is indicated at reference numeral 635. A one dimensionally selectable overlap of footprint 624 over keystroke region 620 is indicated at reference numeral 636. A one dimensionally selectable overlap of background signal pattern 634 over keystroke region 620 is indicated at reference numeral 637. A one dimensionally selectable overlap of superimposition 635 over keystroke region 620 is indicated at reference numeral 638.

FIG. 12A illustrates a bias function 640 corresponding to a cross section of the keystroke region 620 taken along axis 618, which bias function defines keystroke region 620 along axis 618. There is also seen a signal function 644 corresponding to a cross section of the footprint 624 along axis 618; a background signal function 646 corresponding to a cross section of the background signal pattern 634 along axis 618 and a combination signal 648 corresponding to a cross section of the superimposition 635.

There is also shown in FIG. 12A a one dimensional convolution 650 corresponding to one dimensionally selectable overlap 636; a one dimensional convolution 652 corresponding to one dimensionally selectable overlap 637 and a one dimensional convolution 654 corresponding to one dimensionally selectable overlap 638. Convolution 650 is shown with a threshold 660; convolution 652 is shown with a threshold 662 and convolution 654 is shown with a threshold 664.

Turning now to FIG. 11B, there is shown arranged along a common arbitrary axis 670 a simplified keystroke region 680 corresponding to a given key and containing a plurality of pixels 682. The simplified keystroke region 680 is here shown surrounded by a simplified keystroke region border 683. A typical simplified footprint of a typical light pattern occasioned by data entry object engagement with the given key is indicated by reference numeral 684. A typical background signal pattern is indicated by reference numeral 686. Superimposition of the footprint 684 over the background signal pattern 686 is indicated at reference numeral 688. A one dimensionally selectable overlap of footprint 684 over keystroke region 680 and border 683 is indicated at reference numeral 690. A one dimensionally selectable overlap of background signal pattern 686 over keystroke region 680 and border 683 is indicated at reference numeral 692. A one dimensionally selectable overlap of superimposition 688 over keystroke region 680 and border 683 is indicated at reference numeral 694.

FIG. 12B illustrates a bias function 700 corresponding to a cross section of the keystroke region 680 and of the border 683 taken along axis 670, which bias function defines keystroke region 680 along axis 670. It is seen that border 683 is assigned a negative value relative to the value of the keystroke region 680. This value assignment is appreciated to enhance the value of data entry object engagements to the extent that they lie within the keystroke region 680 and to decrease the value of such data entry object engagements to the extent that they extend over the border 683. There is also seen a signal function 704 corresponding to a cross section of the footprint 684 along axis 670; a background signal function 706 corresponding to a cross section of the background signal pattern 686 along axis 670 and a combination signal 708 corresponding to a cross section of the superimposition 688.

There is also shown in FIG. 12B a one dimensional convolution 720, corresponding to one dimensionally selectable overlap 690; a one dimensional convolution 722, corresponding to one dimensionally selectable overlap 692 and a one dimensional convolution 724 corresponding to one dimensionally selectable overlap 694. Convolution 720 is shown with a threshold 726; convolution 722 is shown with a threshold 727 and convolution 724 is shown with a threshold 728.

Turning now to FIG. 11C, there is shown arranged along a common arbitrary axis 730 a simplified keystroke region 740 corresponding to a given key and containing a plurality of pixels 741. The simplified keystroke region 740 is here shown surrounded by a simplified keystroke region inner border 742 and by a simplified keystroke region outer border 743. A typical simplified footprint of a typical light pattern occasioned by data entry object engagement with the given key is indicated by reference numeral 744. A typical background signal pattern is indicated by reference numeral 746. Superimposition of the footprint 744 over the background signal pattern 746 is indicated at reference numeral 748. A one dimensionally selectable overlap of footprint 744 over keystroke region 740 and borders 742 and 743 is indicated at reference numeral 750. A one dimensionally selectable overlap of background signal pattern 746 over keystroke region 740 and borders 742 and 743 is indicated at reference numeral 752. A one dimensionally selectable overlap of superimposition 748 over keystroke region 740 and borders 742 and 743 is indicated at reference numeral 754.

FIG. 12C illustrates a bias function 760 corresponding to a cross section of the keystroke region 740 and of the borders 742 and 743 taken along axis 730, which bias function defines keystroke region 740 along axis 730. It is seen that border 742 is assigned a zero value and border 743 is assigned a negative value relative to the value of the keystroke region 740. It is appreciated that these value assignments enhance the value of data entry object engagements that to the extent that they lie within the keystroke region 740 and to decrease the value of such data entry object engagements to the extent that they extend across the border 742 and at least into border 743. There is also seen a signal function 764 corresponding to a cross section of the footprint 744 along axis 730; a background signal function 766 corresponding to a cross section of the background signal pattern 746 along axis 730 and a combination signal 768 corresponding to a cross section of the superimposition 748.

There is also shown in FIG. 12C a one dimensional convolution 780, corresponding to one dimensionally selectable overlap 750; a one dimensional convolution 782, corresponding to one dimensionally selectable overlap 752 and a one dimensional convolution 784 corresponding to one dimensionally selectable overlap 754. Convolution 780 is shown with a threshold 786; convolution 782 is shown with a threshold 787 and convolution 784 is shown with a threshold 788.

It may be appreciated from a consideration of convolutions 638, 694 and 754 that the dual border arrangement of FIGS. 11C and 12C provides the best detection of data entry object keystroke engagement, while minimizing background effects.

Figure 13:
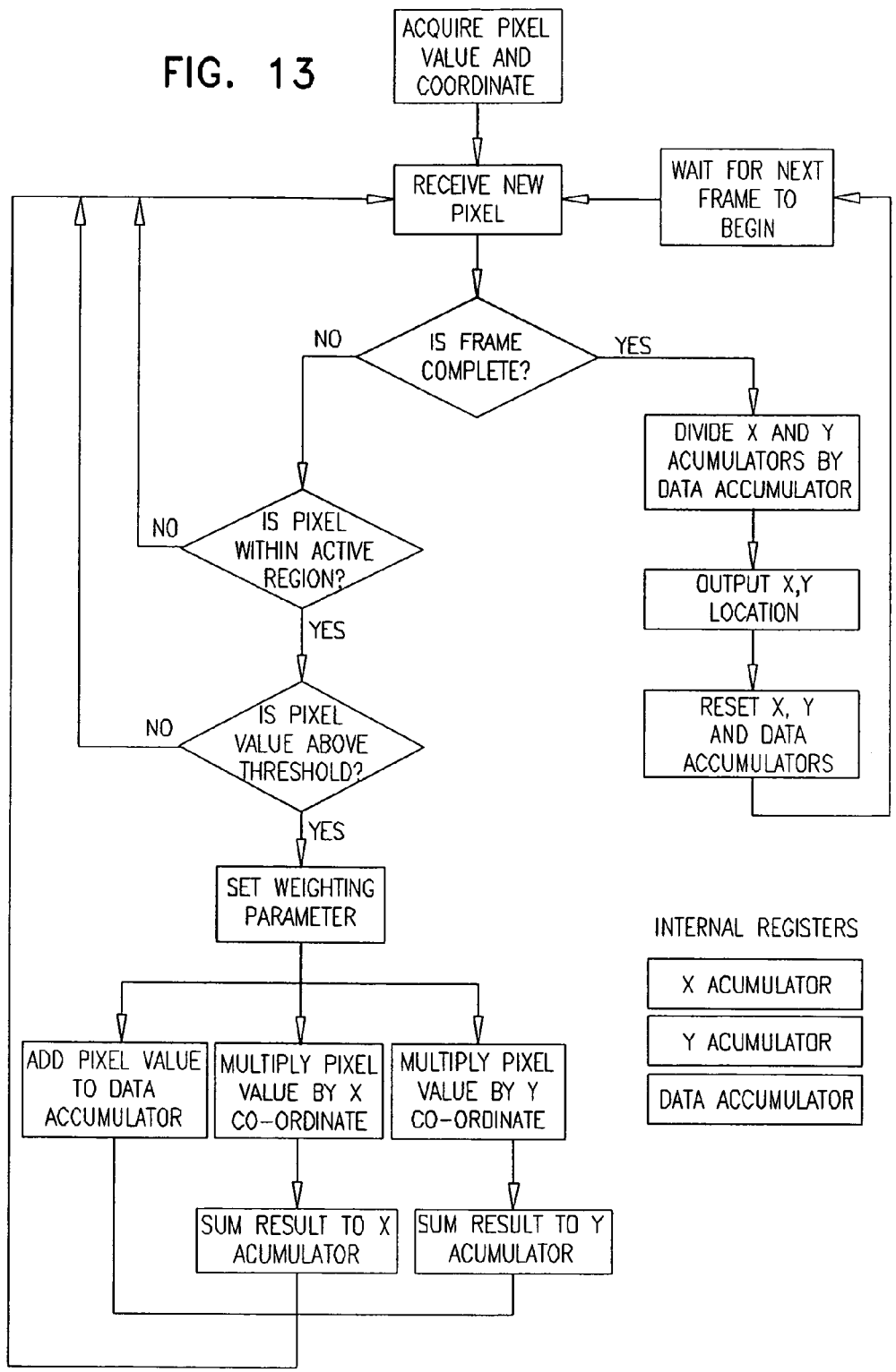
FIG. 13 is a simplified flow chart illustrating operation of a data entry object engagement location sensing subsystem employed in a tracking system and methodology constructed and operative in accordance with a preferred embodiment of the present invention.

Reference is now made to FIG. 13, which is a simplified flow chart illustrating operation of a data entry object engagement location sensing subsystem employed in a tracking system and methodology constructed and operative in accordance with a preferred embodiment of the present invention.

As seen in FIG. 13, pixel values, such as gray level values, are acquired for various pixel coordinates. As each pixel value is acquired, a determination may be made, using the pixel coordinates, as to whether that pixel lies within a predefined active region. Typically, if the pixel does not lie within a predetermined active region, its value is ignored.

The pixel value for each pixel is preferably thresholded and typically all pixel values falling below a given threshold are ignored. The remaining pixel values may be weighted by a selected weighting parameter. In order to determine the "center of gravity" of the thresholded and weighted pixel values, the thresholded and weighted pixel values are multiplied respectively by X and Y values representing the coordinate position of each pixel and the results are summed along mutually perpendicular axes X and Y and stored in X and Y accumulators. The total of the thresholded and weighted pixel values for all relevant pixels are also summed and stored in a data accumulator, for the entire active region.

Once all of the pixels in a frame have been processed as aforesaid, the summed thresholded and weighted pixel values along the X and Y axes respectively are divided by the total of the thresholded and weighted pixel values for the entire active region to determine the X and Y coordinates of the "center of gravity", which represents a desired engagement location.

Figure 14:
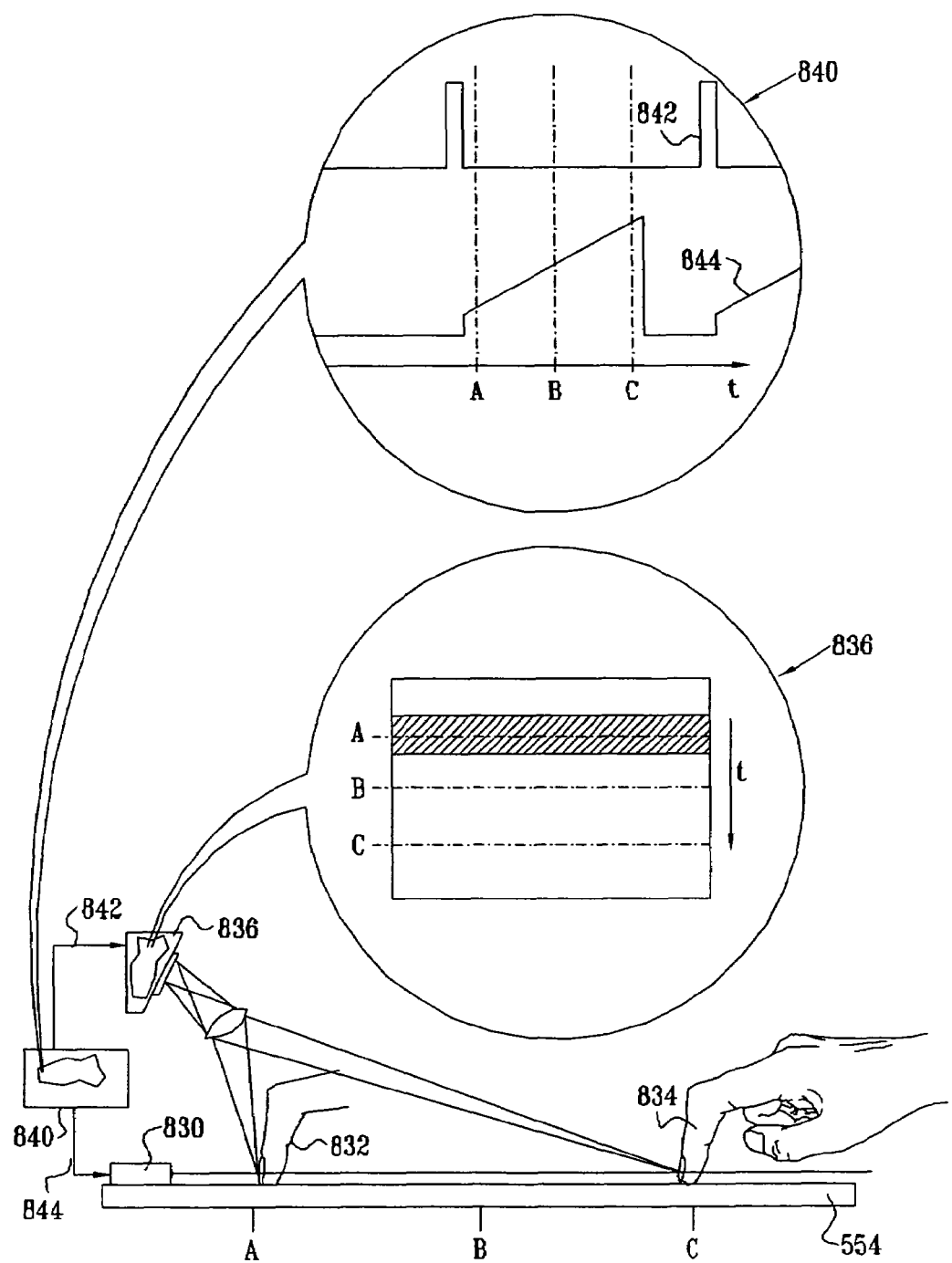
FIG. 14 is a simplified illustration showing synchronized illumination power variation functionality useful in accordance with a preferred embodiment of the present invention.

Reference is now made to FIG. 14, which is a simplified illustration showing synchronized illumination power variation functionality useful in accordance with a preferred embodiment of the present invention. The functionality illustrated in FIG. 14 is directed to modulating the amount of illumination provided for data entry object engagement detection. This modulation is desirable because the intensity of light impinging on a data entry object and thus scattered thereby, decreases with the distance between an illuminator 830 and a data entry object. Thus, it may be appreciated that the amount of light impinging on a data entry object 832 is substantially greater than the amount of light impinging on a data entry object 834. Furthermore, the amount of scattered light impinging on a detector 836 decreases with the distance between the data entry object and the detector. These two distance dependencies make detection of data entry object engagement difficult.

In order to overcome this difficulty, there is provided in accordance with a preferred embodiment of the present invention variable intensity drive electronics 840 which is coupled to both illuminator 830 and detector 836 and which causes the intensity of light produced by the illuminator 830 to vary, typically in a ramp fashion, in synchronization to the imaging field location of detector 836.

Thus, it may be seen that when a near portion (A) of the engagement surface 554 (FIG. 6) is being imaged, typically at the top portion A of detector 836, the intensity is at a minimum. When an intermediate portion (B) of the engagement surface 554 is being imaged, typically at the middle of detector 836, the intensity is at an intermediate level and when a far portion (C) of the engagement surface 554 is being imaged, typically at the bottom portion (C) of the detector 836, the intensity is at a maximum.

Variable intensity drive electronics 840 operates preferably by providing a synchronization output 842 to detector 836 and a corresponding synchronization output 844 to illuminator 830, causing the intensity level to increase in time in synchronization with the location of a scanned image region in detector 836.

Figure 15:
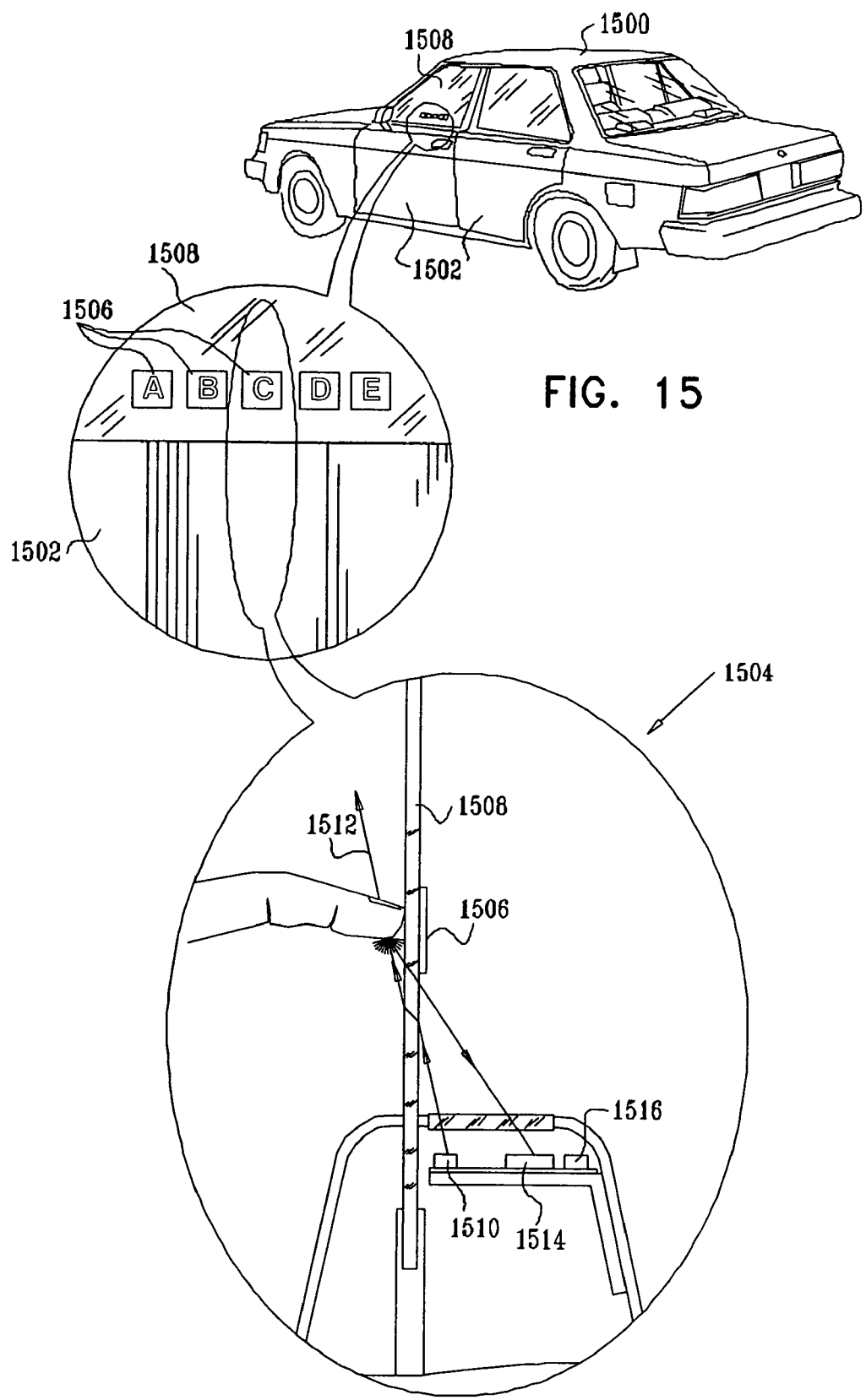
FIG. 15 is a simplified partially pictorial, partially diagrammatic illustration of data entry apparatus embodied in a vehicle access control system.

Reference is now made to FIG. 15, which is a simplified partially pictorial, partially diagrammatic illustration of data entry apparatus embodied in a vehicle access control system. As seen in FIG. 15, a vehicle 1500, typically comprising a frame, a drive train and a chassis including at least one lockable entry portal or door 1502 and portal unlocking functionality, includes an access control assembly designated generally by reference numeral 1504.

The access control assembly 1504 preferably includes at least one at least partially light transmissive user finger engagement surface accessible from outside the chassis. In the illustrated embodiment, plural user finger engagement surfaces 1506 are defined on a car door window 1508. An illuminator 1510, preferably located interiorly of the exterior of the vehicle, such as an IR line generator, is operative to illuminate a finger engagement plane 1512 adjacent the user finger engagement surfaces 1506. A preferred IR line generator is described in applicant's Published PCT Application WO02/054169 A2, the disclosure of which is hereby incorporated by reference.

A two-dimensional imaging sensor 1514, located interiorly of the exterior of the vehicle, views the finger engagement surfaces 1506, from a location inwardly of the car door window 1508, for sensing light originating from the illuminator 1510, which is scattered by engagement of a user's finger with the finger engagement surfaces 1506. A preferred two-dimensional imaging sensor 1514 is described in applicant's Published PCT Application WO02/054169 A2, the disclosure of which is hereby incorporated by reference.

A data entry processor 1516 receives an output from the two-dimensional imaging sensor 1514 and provides a data entry input to a conventional door unlocking functionality (not shown).

Figure 16:
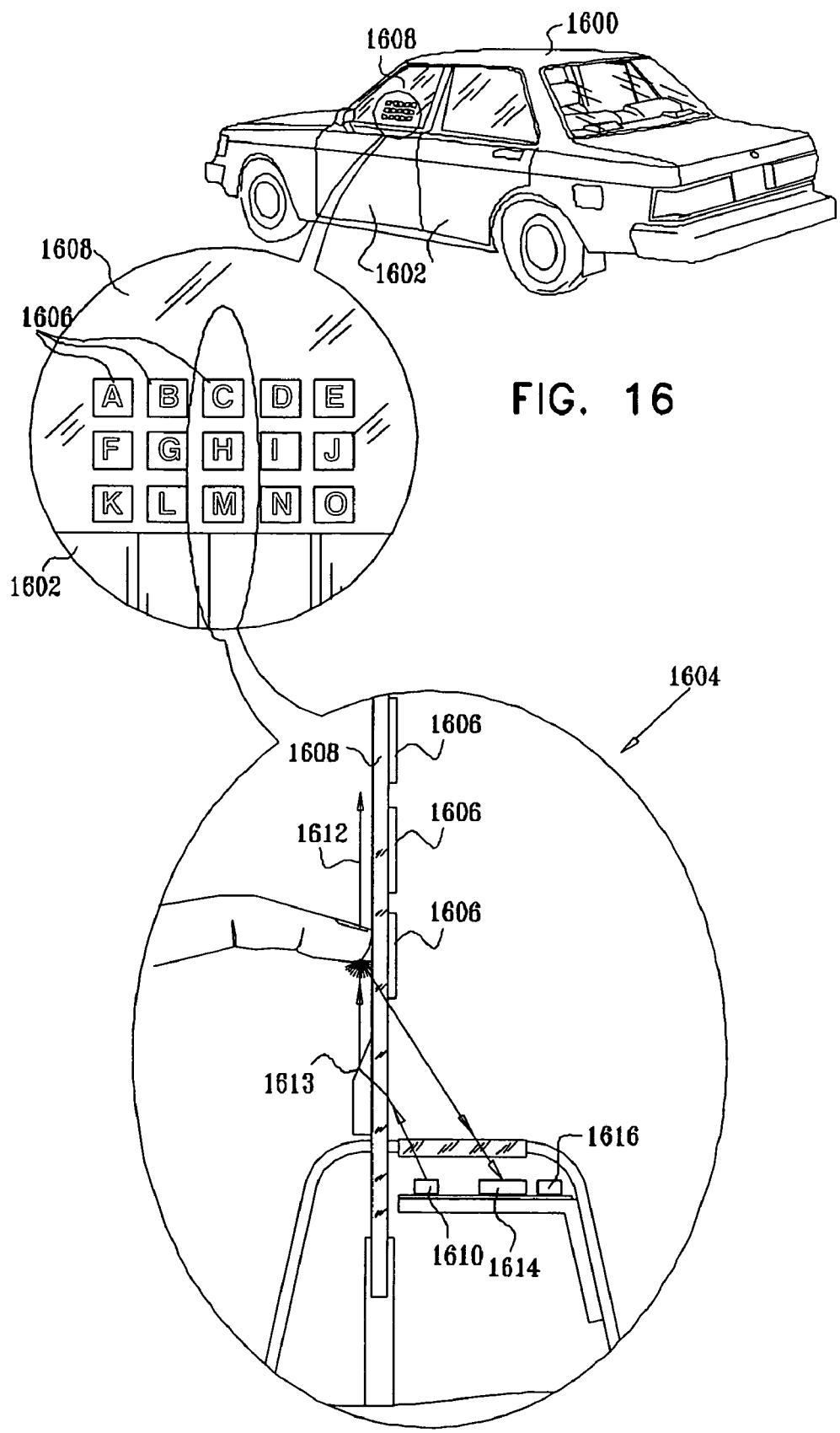
FIG. 16 is a simplified partially pictorial, partially diagrammatic illustration of a variation in the data entry apparatus of FIG. 15.

Reference is now made to FIG. 16, which is a simplified diagrammatic illustration of a variation in the data entry apparatus of FIG. 15. As seen in FIG. 16, a vehicle 1600, typically comprising a frame, a drive train and a chassis including at least one lockable entry portal or door 1602 and portal unlocking functionality, includes an access control assembly designated generally by reference numeral 1604.

The access control assembly 1604 preferably includes at least one at least partially light transmissive user finger engagement surface accessible from outside the chassis. In the illustrated embodiment, plural user finger engagement surfaces 1606 are defined on a car door window 1608. In this embodiment, the plural user finger engagement surfaces 1606 may be arranged in a two-dimensional array. An illuminator 1610, preferably located interiorly of the exterior of the vehicle, such as an IR line generator, is operative to illuminate a finger engagement plane 1612 adjacent the user finger engagement surfaces 1606. A preferred IR line generator is described in applicant's Published PCT Application WO02/054169 A2, the disclosure of which is hereby incorporated by reference.

In the embodiment of FIG. 16, the finger engagement planes 1612 are parallel to the finger engagement surfaces 1606, by virtue of provision of a prism 1613 disposed typically on the outside of the vehicle window 1608 along the light path from illuminator 1610.

A two-dimensional imaging sensor 1614, located interiorly of the exterior of the vehicle, views the finger engagement surfaces 1606, from a location inwardly of the car door window 1608, for sensing light originating from the illuminator 1610, which is scattered by engagement of a user's finger with the finger engagement surfaces 1606. A preferred two-dimensional imaging sensor 1614 is described in applicant's Published PCT Application WO02/054169 A2, the disclosure of which is hereby incorporated by reference.

A data entry processor 1616 receives an output from the two-dimensional imaging sensor 1614 and provides a data entry input to a conventional door unlocking functionality (not shown).

It is appreciated that portions of the apparatus of FIGS. 15 and 16 may find application in other types of access control environments and in various data entry environments.

Figure 17:
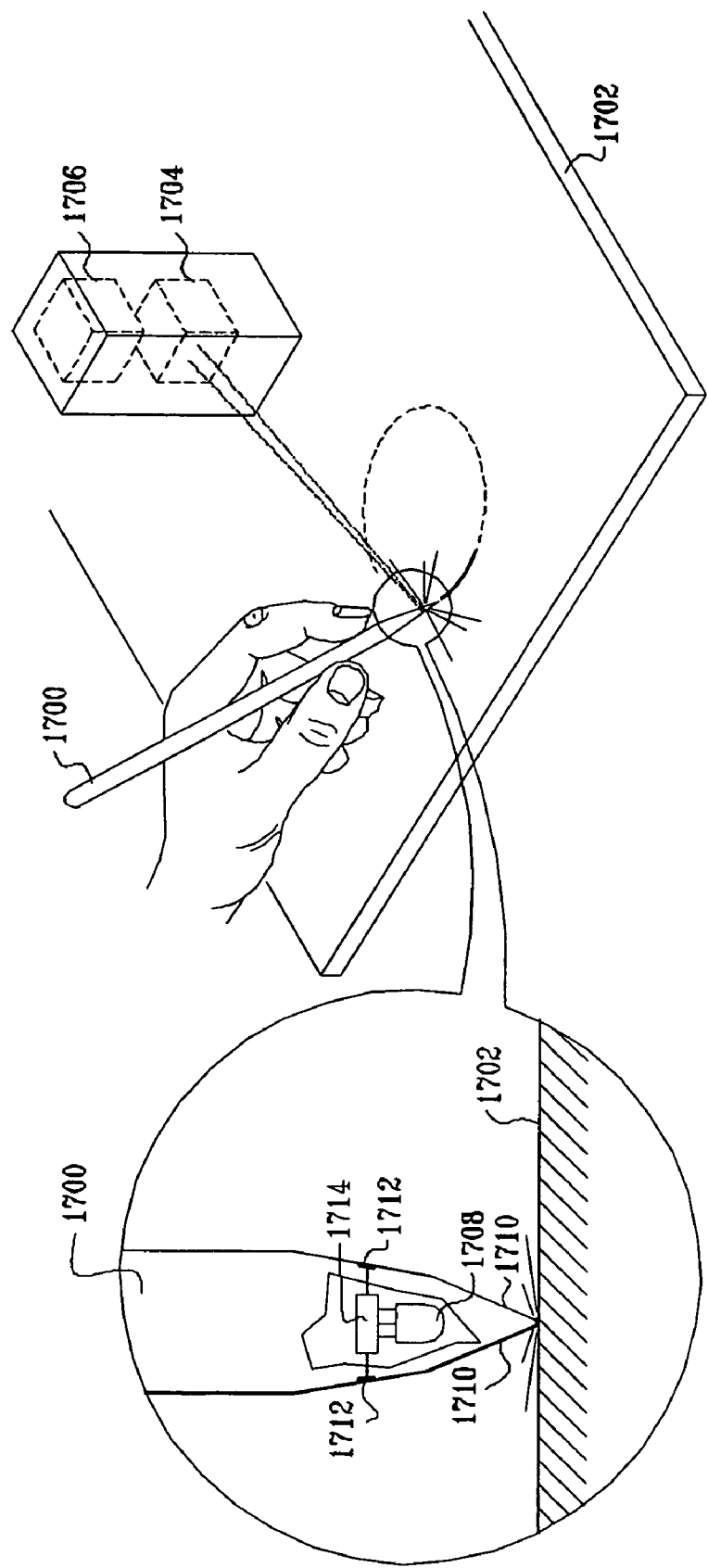
FIG. 17 is a simplified pictorial illustration of data entry apparatus constructed and operative in accordance with another preferred embodiment of the present invention.

Reference is now made to FIG. 17, which is a simplified pictorial illustration of data entry apparatus constructed and operative in accordance with another preferred embodiment of the present invention. As seen in FIG. 17, a light emitting data entry engagement element, preferably in the form of a stylus 1700, emits light when and only when it is in at least predetermined propinquity to an engagement surface 1702.

A two-dimensional imaging sensor 1704 views the engagement surface 1702 for sensing light emitted by the stylus 1700. A data entry processor 1706 receives an output from the two-dimensional imaging sensor 1704 and provides a data entry input.

As seen in FIG. 17, the stylus 1700 preferably comprises an IR emitting LED 1708 located in an IR transmissive tip 1710 thereof. A proximity switch 1712, such as a contact switch, provides an output indication of the proximity of tip 1710 to engagement surface 1702. Circuitry 1714 receives an input from proximity switch 1712 and operates the LED 1708 accordingly, so as to provide an IR emission whose location indicates the location of stylus impingement with engagement surface 1702.

Figure 18A:
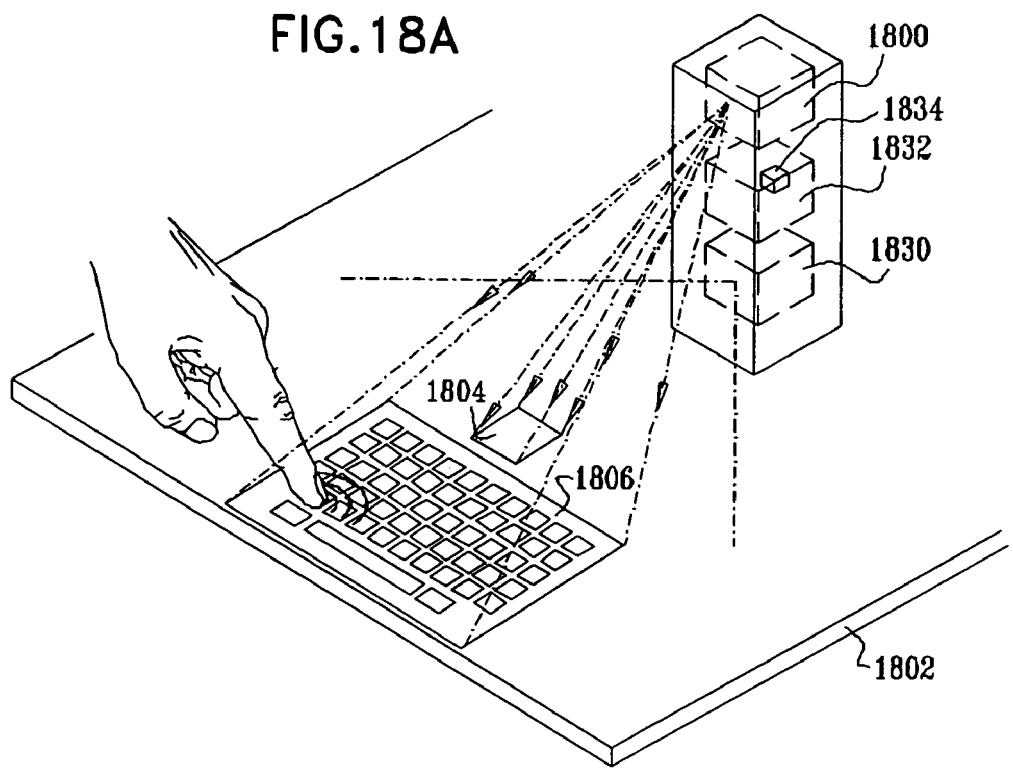
FIGS. 18A and 18B are respectively a simplified pictorial and a simplified sectional illustration of data entry apparatus constructed and operative in accordance with another preferred embodiment of the present invention.
Figure 18B:
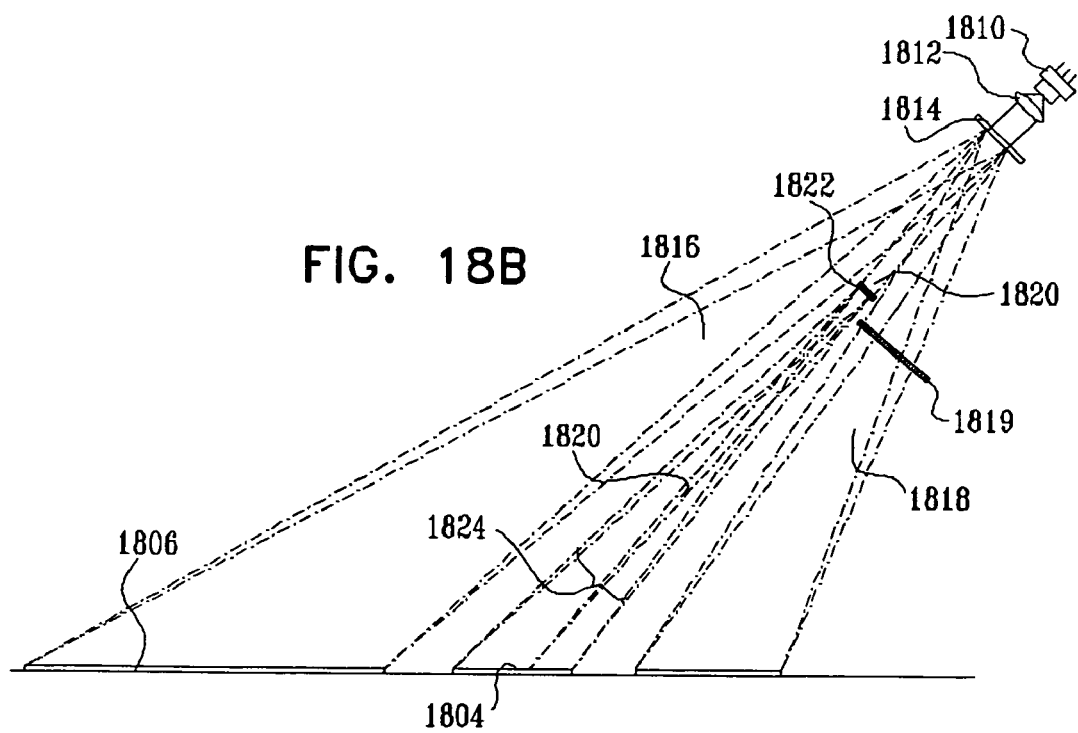

Reference is now made to FIGS. 18A and 18B, which are respectively a simplified pictorial and a simplified sectional illustration of data entry apparatus constructed and operative in accordance with another preferred embodiment of the present invention. As seen in FIGS. 18A & 18B, the data entry apparatus comprises a projector 1800 operative to illuminate at least one engagement surface 1802 and to define thereon at least one touchpad region 1804 and at least one keyboard region 1806, the touchpad region 1804 being defined by a zero'th order diffracted image provided by the projector 1800.

Turning particularly to FIG. 18B, it is seen that the projector 1800 comprises a light source, such as a diode laser 1810, which outputs via a collimating lens 1812 onto a first diffractive optical element 1814. Diffractive optical element 1814 diffracts the light impinging thereon into a primary keyboard image beam 1816 which impinges on at last one keyboard region 1806 and into a secondary ghost image beam 1818, which is preferably blocked by a barrier 1819. Residual light passing through diffractive optical element 1814 defines a zero'th order beam 1820, which impinges onto a second diffractive optical element 1822.

Diffractive optical element 1822 diffracts the light impinging thereon from the zero'th order beam 1820 into a touchpad defining beam 1824 which impinges on at least one touchpad region 1804.

Returning to FIG. 18A, it is seen that there is also provided an illuminator 1830, operative to illuminate the finger engagement surface. A two-dimensional imaging sensor 1832 views the engagement surface for sensing light from the illuminator 1830 scattered by engagement of a user's finger with the finger engagement surface. A data entry processor 1834 receives an output from the two-dimensional imaging sensor 1832 and provides a data entry input.

Figure 19A:
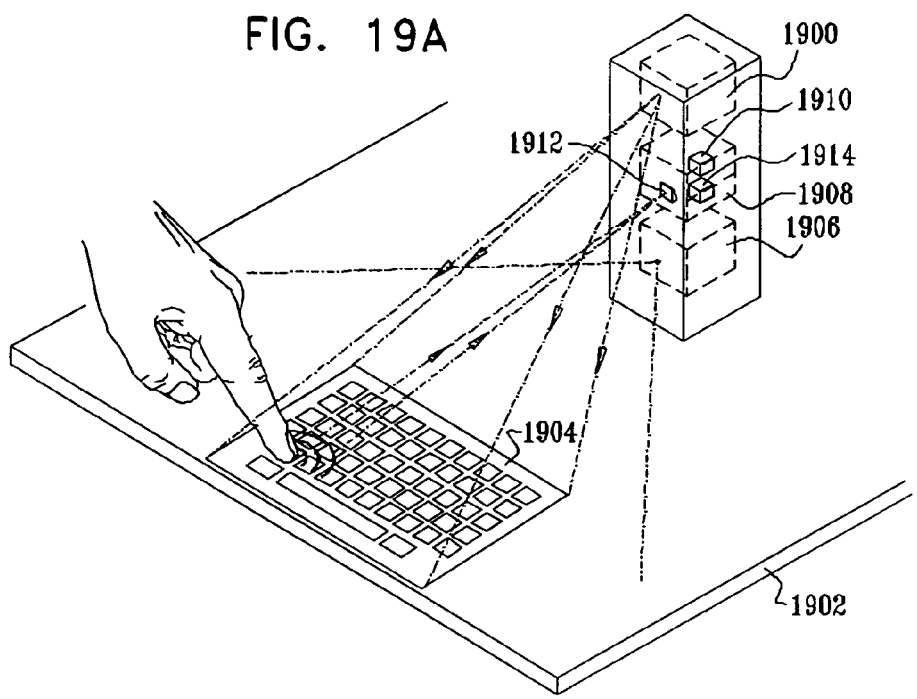
FIGS. 19A and 19B are respectively a simplified pictorial and a simplified sectional illustration of data entry apparatus constructed and operative in accordance with yet another preferred embodiment of the present invention.
Figure 19B:
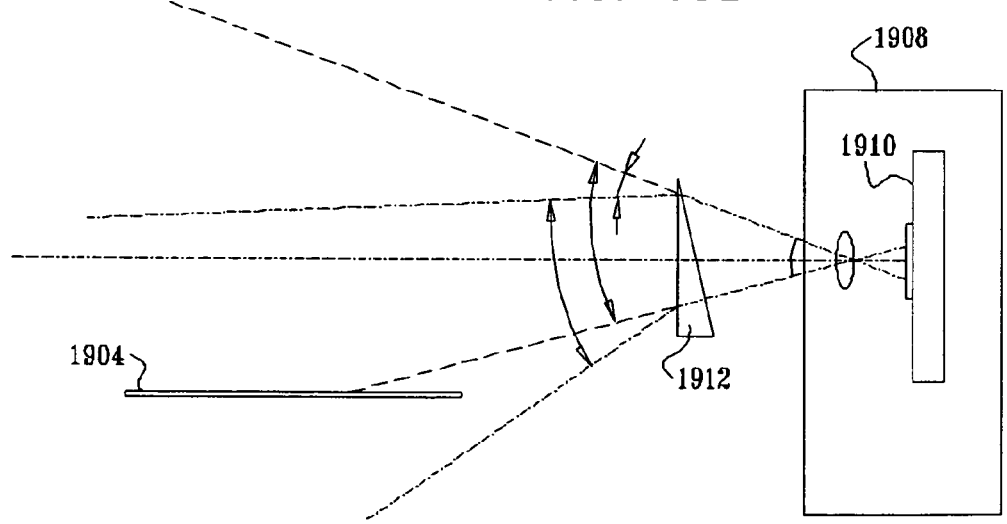

Reference is now made to FIGS. 19A and 19B, which are respectively a simplified pictorial and a simplified sectional illustration of data entry apparatus constructed and operative in accordance with yet another preferred embodiment of the present invention. As seen in FIGS. 19A & 19B, the data entry apparatus comprises a projector 1900 operative to illuminate at least one finger engagement surface 1902 and to define thereon typically at least one keyboard region 1904. An illuminator 1906 is operative to illuminate the finger engagement surface 1902.

An imaging sensor module 1908, including a two-dimensional imaging sensor 1910, views the engagement surface for sensing light from the illuminator 1906 scattered by engagement of a user's finger with the finger engagement surface 1902. A particular feature of the imaging sensor module 1908 is that it includes an optical wedge element 1912 which provides a tilt, enabling a generally vertically disposed imaging sensor 1910 to efficiently sense light from a finger engagement surface 1902 extending generally perpendicularly thereto.

A data entry processor 1914 receives an output from the two-dimensional imaging sensor 1910 and provides a data entry input.

Figure 20A:
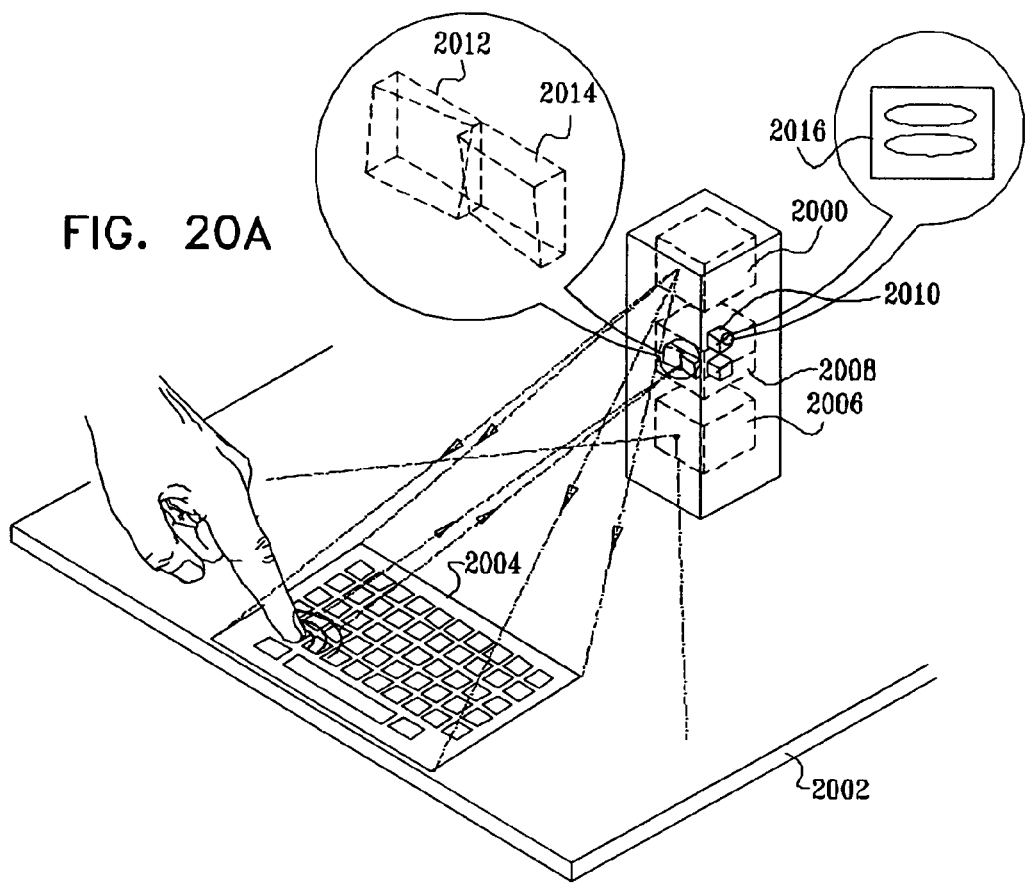
FIGS. 20A and 20B are respectively a simplified pictorial and a simplified sectional illustration of data entry apparatus constructed and operative in accordance with still another preferred embodiment of the present invention.
Figure 20B:
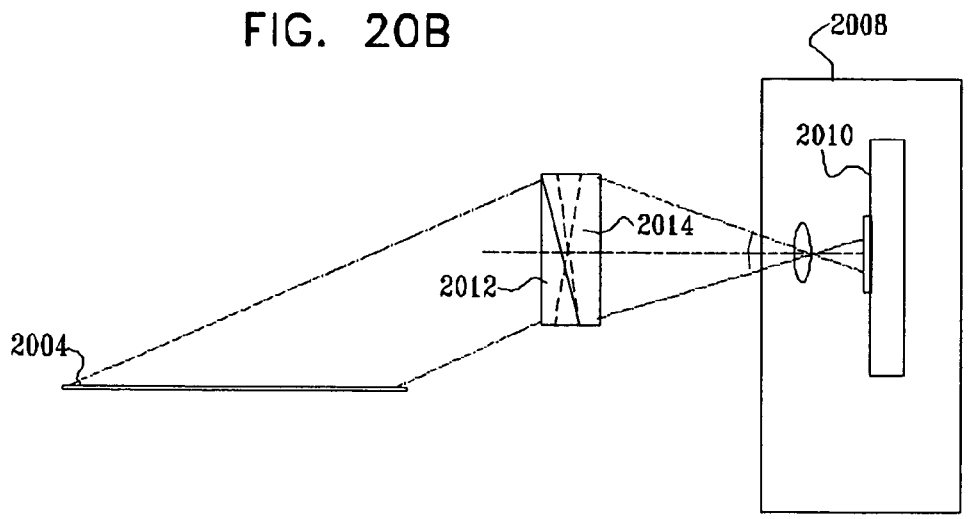

Reference is now made to FIGS. 20A and 20B, which are respectively a simplified pictorial and a simplified sectional illustration of data entry apparatus constructed and operative in accordance with still another preferred embodiment of the present invention. As seen in FIGS. 20A & 20B, the data entry apparatus comprises a projector 2000 operative to illuminate at least one finger engagement surface 2002 and to define thereon typically at least one keyboard region 2004. An illuminator 2006 is operative to illuminate the finger engagement surface 2002.

An imaging sensor module 2008, including a two-dimensional imaging sensor 2010, views the engagement surface for sensing light from the illuminator 2006 scattered by engagement of a user's finger with the finger engagement surface 2002. A particular feature of the imaging sensor module 2008 is that it includes a pair of oppositely oriented optical wedge elements 2012 and 2014, each of which provides a tilt to a portion of the light incoming to sensor 2010, enabling efficient use of area of generally rectangular imaging sensor, as seen at reference number 2016.

Figure 21:
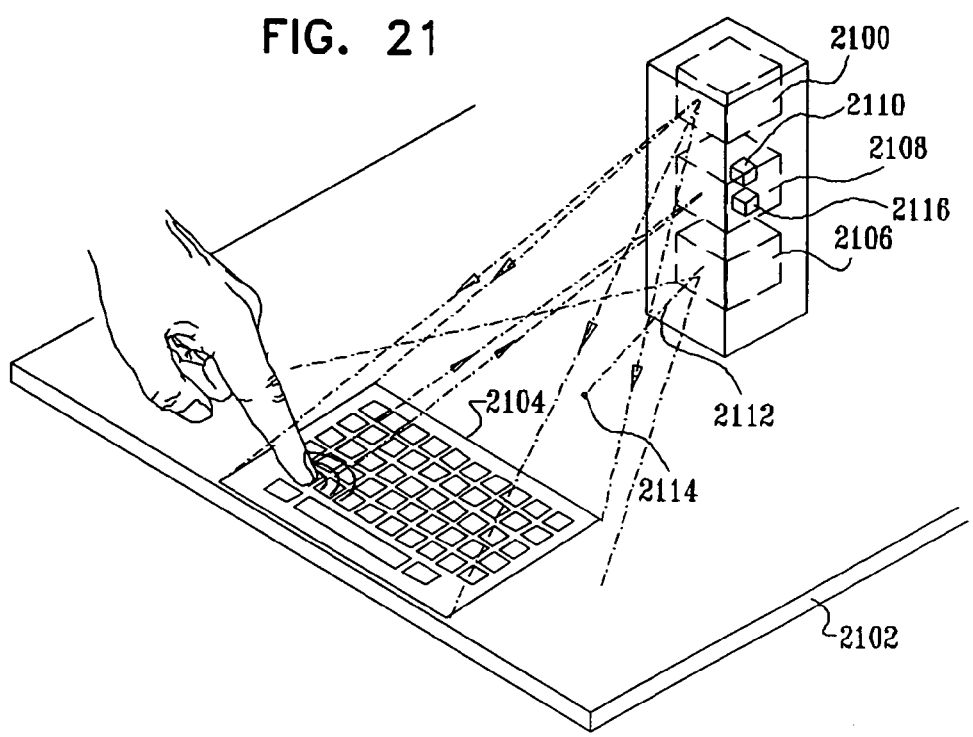
FIG. 21 is a simplified pictorial illustration of data entry apparatus constructed and operative in accordance with a further preferred embodiment of the present invention.

Reference is now made to FIG. 21, which is a simplified pictorial illustration of data entry apparatus constructed and operative in accordance with yet another preferred embodiment of the present invention. As seen in FIG. 21, the data entry apparatus comprises a projector 2100 operative to illuminate at least one finger engagement surface 2102 and to define thereon typically at least one keyboard region 2104. An illuminator 2106 is operative to illuminate the finger engagement surface 2102.

An imaging sensor module 2108, including a two-dimensional imaging sensor 2110, views the engagement surface for sensing light from the illuminator 2106 scattered by engagement of a user's finger with the finger engagement surface 2102.

A particular feature of the illuminator 2106 is that defines an auxiliary light path 2112 which impinges on a proper positioning confirmation location 2114 on the finger engagement surface 2102 adjacent and preferably nearer to the illuminator than the at least one keyboard region 2104. The imaging sensor module 2108 senses the presence of illumination at location 2114 and in the absence of sensed illumination at that location, typically indicating improper placement of the data entry apparatus, typically unpowers the data entry apparatus.

A data entry processor 2116 receives an output from the two-dimensional imaging sensor 2110 and provides a data entry input.

Reference is now made to FIG. 22, which is a simplified pictorial illustration of data entry apparatus constructed and operative in accordance with another preferred embodiment of the present invention in the form of a wristwatch. As seen in FIG. 22, a wristwatch 2200, which may be of conventional construction other than as specifically described hereinbelow, is equipped with an electronic imaging sensor module 2202, which may include a CMOS array, for example, CMOS array OVT6130, available from Omnivision Technologies, Inc., 1341 Orleans Drive, Sunnyvale, Calif., USA, providing an output representing an imaged field.

A user-operated imaging functionality selection switch 2204 is preferably provided to enable a user to select operation in a data entry functionality employing the electronic imaging sensor module 2202 for data entry responsive to user hand activity.

The data entry functionality preferably employs a data entry template projector 2206, which projects a data entry template, such as that designated by reference numeral 2208, onto a surface, such as a table surface 2210. An illuminator 2212 is operative to illuminate a region adjacent the data entry template. The imaging sensor module 2202 views the data entry template region for sensing light from the illuminator 2212 scattered by engagement of a user's finger with the data entry template.

The data entry functionality also preferably incorporates processing functionality, an example of which is described in applicant's Published PCT Application WO 02/054169 A2, the disclosure of which is hereby incorporated by reference. The data entry functionality produces a stream of data 2214.

Reference is now made to FIG. 23, which is a simplified pictorial illustration of gaming apparatus constructed and operative in accordance with a preferred embodiment of the present invention. As seen in FIG. 23, gaming apparatus, one example of which is a board game, such as chess, is provided with an electronic imaging sensor module 2302, which may include a CMOS array, for example, CMOS array OVT6130, available from Omnivision Technologies, Inc., 1341 Orleans Drive, Sunnyvale, Calif., USA, providing an output representing an imaged field.

A user-operated imaging functionality selection switch 2304 is preferably provided to enable a user to select operation of one of plural gaming functionalities, such as different board games, employing the electronic imaging sensor module 2302 for gaming piece locating.

The gaming functionality preferably employs a gaming template projector 2306, which projects a game template, such as a chess board, designated by reference numeral 2308, onto a surface, such as a table surface 2310. An illuminator 2312 is operative to illuminate a region adjacent the game template 2308. The imaging sensor module 2302 views the game template region for sensing light from the illuminator 2312 reflected by optically encoded reflectors 2314 mounted on individual gaming pieces 2316. The reflectors 2314 preferably individually identify each gaming piece and indicate its location on the game template 2308.

The gaming functionality also preferably incorporates processing functionality, an example of which is described in applicant's Published PCT Application WO 02/054169 A2, the disclosure of which is hereby incorporated by reference. The gaming functionality produces a stream of data 2316, which may be used for game management and scoring.

Reference is now made to FIG. 24, which is a simplified pictorial illustration of gaming apparatus constructed and operative in accordance with another preferred embodiment of the present invention. FIG. 24 shows gaming pieces, such as dice 2402, which bear variously differently coded reflectors 2404 on various surfaces thereof, thereby to enable not only the identity and location but also the spatial orientation of the gaming pieces to be sensed.

It will be appreciated by persons skilled in the art that the present invention is not limited to what has been particularly shown and described hereinabove. Rather the scope of the present invention includes both combinations and subcombinations of the various features described hereinabove as well as modifications and variations thereof as would occur to a person of skill in the art upon reading the foregoing specification and which are not in the prior art.

The invention claimed is:

1. A vehicle comprising:
 a frame, a drive train and a chassis, including at least one lockable entry portal and portal unlocking functionality; and
 an access control assembly for governing authorized access to said at least one lockable entry portal comprising:
  at least one at least partially light transmissive user finger engagement surface accessible from outside said chassis;
  an illuminator operative to illuminate at least one user finger engagement plane adjacent said at least one user finger engagement surface;
  a two-dimensional imaging sensor viewing said at least one user finger engagement surface, from a location inwardly of said at least one finger engagement surface, for sensing light from said illuminator scattered by engagement of a user's finger with said at least one finger engagement surface; and
  a data entry processor receiving an output from said two-dimensional imaging sensor and providing a data entry input to said portal unlocking functionality.

2. A vehicle according to claim 1 wherein said illuminator is located at a location inwardly of said at least one engagement surface.

3. A vehicle according to claim 1 wherein said at least one finger engagement surface comprises a one-dimensional array of a plurality of finger engagement surfaces.

4. A vehicle according to claim 1 wherein said at least one finger engagement surface comprises a two-dimensional array of a plurality of finger engagement surfaces.

5. A vehicle according to claim 1 and also comprising an illumination director cooperating with said illuminator for providing an illumination beam generally parallel to said at least one finger engagement surface.

6. A vehicle according to claim 5 wherein said illumination director comprises a prism.

7. Access control apparatus for use with a vehicle including a chassis having at least one lockable entry portal and portal unlocking functionality and also including at least one at least partially light transmissive user finger engagement surface accessible from outside said chassis, said access control apparatus comprising:
 an illuminator operative to illuminate at least one user finger engagement plane adjacent said at least one user finger engagement surface;
 a two-dimensional imaging sensor viewing said at least one user finger engagement surface from a location inwardly of said at least one finger engagement surface for sensing light from said illuminator scattered by engagement of a user's finger with said at least one finger engagement surface; and
 a data entry processor receiving an output from said two-dimensional imaging sensor and providing a data entry input to said portal unlocking functionality.

8. Access control apparatus according to claim 7 wherein said illuminator is located at a location inwardly of said at least one engagement surface.

9. Access control apparatus according to claim 7 wherein said at least one finger engagement surface comprises a one-dimensional array of a plurality of finger engagement surfaces.

10. Access control apparatus according to claim 7 wherein said at least one finger engagement surface comprises a two-dimensional array of a plurality of finger engagement surfaces.

11. Access control apparatus according to claim 7 and also comprising an illumination director cooperating with said illuminator for providing an illumination beam generally parallel to said at least one finger engagement surface.

12. Access control apparatus according to claim 11 and wherein said illumination director comprises a prism.

13. Access control apparatus for use with an enclosure having at least one lockable entry portal and portal unlocking functionality and also including at least one at least partially light transmissive user finger engagement surface accessible from outside said enclosure, said access control apparatus comprising:
 an illuminator operative to illuminate at least one user finger engagement plane adjacent said at least one user finger engagement surface;
 a two-dimensional imaging sensor viewing said at least one user finger engagement surface from a location inwardly of said at least one finger engagement surface for sensing light from said illuminator scattered by engagement of a user's finger with said at least one finger engagement surface; and
 a data entry processor receiving an output from said two-dimensional imaging sensor and providing a data entry input to said portal unlocking functionality.

14. Access control apparatus according to claim 13 wherein said illuminator is located at a location inwardly of said at least one engagement surface.

15. Access control apparatus according to claim 13 wherein said at least one finger engagement surface comprises a one-dimensional array of a plurality of finger engagement surfaces.

16. Access control apparatus according to claim 13 wherein said at least one finger engagement surface comprises a two-dimensional array of a plurality of finger engagement surfaces.

17. Access control apparatus according to claim 13 and also comprising an illumination director cooperating with said illuminator for providing an illumination beam generally parallel to said at least one finger engagement surface.

18. Access control apparatus according to claim 17 wherein said illumination director comprises a prism.

19. Data entry apparatus for use with at least one at least partially light transmissive user finger engagement surface, said data entry apparatus comprising:
 an illuminator operative to illuminate at least one user finger engagement plane adjacent said at least one user finger engagement surface;
 an illumination director cooperating with said illuminator for providing an illumination beam generally parallel to said at least one finger engagement surface;

a two-dimensional imaging sensor viewing said at least one user finger engagement surface from a location inwardly of said at least one finger engagement surface for sensing light from said illuminator scattered by engagement of a user's finger with said at least one finger engagement surface; and a data entry processor receiving an output from said two-dimensional imaging sensor and providing a data entry input.

20. Data entry apparatus according to claim 19 wherein said illuminator is located at a location inwardly of said at least one engagement surface.

21. Data entry apparatus according to claim 19 wherein said at least one finger engagement surface comprises a one-dimensional array of a plurality of finger engagement surfaces.

22. Data entry apparatus according to claim 19 wherein said at least one finger engagement surface comprises a two-dimensional array of a plurality of finger engagement surfaces.

23. Data entry apparatus according to claim 19 wherein said illumination director comprises a prism.

* * * * *